US012799236B2

(12) United States Patent
Chen et al.

(10) Patent No.: US 12,799,236 B2
(45) Date of Patent: Nov. 17, 2026

(54) ZIEGLER-NATTA (PRO)CATALYST SYSTEMS MADE WITH AZAHETEROCYCLIC COMPOUND

(71) Applicant: Dow Global Technologies LLC, Midland, MI (US)

(72) Inventors: Linfeng Chen, Missouri City, TX (US); Jesse C. Beilhart, South Charleston, WV (US); Kurt F. Hirsekorn, Sugar Land, TX (US); David T. Gillespie, Pearland, TX (US); Ian M. Munro, Lake Jackson, TX (US); Eduardo Garcia, Katy, TX (US); Nori Williams, Pearland, TX (US); Mridula Kapur, Lake Jackson, TX (US); Evelyn Auyeung, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 672 days.

(21) Appl. No.: 17/995,860

(22) PCT Filed: Apr. 22, 2021

(86) PCT No.: PCT/US2021/028585

§ 371 (c)(1),
(2) Date: Oct. 10, 2022

(87) PCT Pub. No.: WO2021/221987

PCT Pub. Date: Nov. 4, 2021

(65) Prior Publication Data

US 2023/0151125 A1 May 18, 2023

Related U.S. Application Data

(60) Provisional application No. 63/017,757, filed on Apr. 30, 2020.

(51) Int. Cl.
*C08F 4/649* (2006.01)
*C08F 4/654* (2006.01)
(Continued)

(52) U.S. Cl.
CPC .......... *C08F 4/6495* (2013.01); *C08F 4/6543* (2013.01); *C08F 110/00* (2013.01); *C08F 210/00* (2013.01)

(58) Field of Classification Search
CPC .... C08F 4/6495; C08F 4/6543; C08F 110/00; C08F 210/00; C08F 210/16; C08F 210/14;
(Continued)

(56) References Cited

U.S. PATENT DOCUMENTS 4,107,413 A 8/1978 Giannini et al.
4,136,243 A 1/1979 Appleyard et al.
(Continued)

FOREIGN PATENT DOCUMENTS

EP 0193280 9/1986
EP 0506704 10/1992
(Continued)

OTHER PUBLICATIONS

Ferreira, Maria L., and Daniel E. Damiani. "Comparative characterization of MgCl2/ethyl benzoate/TiCl4 and MgCl2/2, 2, 6, 6 tetramethylpiperidine/TiCl4 Ziegler-Natta precatalysts." Journal of Polymer Science Part A: Polymer Chemistry 32.6 (1994): 1137-1147.*
(Continued)

*Primary Examiner* — Richard M Rump

(57) ABSTRACT

Ziegler-Natta (pro)catalyst systems made with an external electron donor compound, methods of synthesis of same,
(Continued)

Table 1C. iCCD Results Showing Effects of EEDC-1 on PCAT-1.

| Ex. | iCCD Results | | | | | | | | | | | | |
|---|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE1 | 0.05 | 0.60 | 0.35 | 29.7 | 99.2 | 13,974 | 41,851 | 122,280 | 0.34 | 0 | 0.11 | 1 | 1 |
| IE1 | 0.04 | 0.60 | 0.36 | 29.7 | 99.4 | 39,583 | 51,677 | 110,264 | 0.47 | 37 | 0.36 | 1.23 | 1.00 |
| IE2 | 0.05 | 0.60 | 0.35 | 29.8 | 99.4 | 43,031 | 61,298 | 123,141 | 0.50 | 45 | 0.35 | 1.46 | 1.00 |
| IE3 | 0.05 | 0.59 | 0.36 | 29.9 | 99.6 | 38,902 | 63,975 | 132,680 | 0.48 | 41 | 0.29 | 1.53 | 0.98 |

methods of olefin polymerization using same, and polyolefin polymers made thereby. The external electron donor compound is an azaheterocycle.

12 Claims, 11 Drawing Sheets

(51) Int. Cl.
*C08F 110/00* (2006.01)
*C08F 210/00* (2006.01)

(58) Field of Classification Search
CPC .............. C08F 2500/02; C08F 2500/06; C08F 2500/12; C08F 2500/18; C08F 2500/35; C08F 2500/07; C08F 2500/08; C08F 2500/10
See application file for complete search history.

(56) References Cited

U.S. PATENT DOCUMENTS

| | | | |
|---|---|---|---|
| 4,252,670 | A | 2/1981 | Caunt et al. |
| 4,263,168 | A | 4/1981 | Rochefort et al. |
| 4,301,029 | A | 11/1981 | Caunt et al. |
| 4,324,691 | A | 4/1982 | Hartshorn et al. |
| 4,330,649 | A | 5/1982 | Kioka et al. |
| 4,381,252 | A | 4/1983 | Sakurai et al. |
| 4,410,672 | A | 10/1983 | Inazawa |
| 4,468,477 | A | 8/1984 | Caunt et al. |
| 4,471,066 | A | 9/1984 | Sakurai et al. |
| 4,477,639 | A | 10/1984 | Nielsen |
| 4,496,660 | A | 1/1985 | Gessell et al. |
| 4,518,706 | A | 5/1985 | Gessell |
| 4,693,990 | A | 9/1987 | Hiroyuki et al. |
| 4,716,206 | A | 12/1987 | Fujita et al. |
| 4,816,433 | A | 3/1989 | Terano et al. |
| 4,826,794 | A | 5/1989 | Coosemans et al. |
| 4,829,037 | A | 5/1989 | Terano et al. |
| 4,847,227 | A | 7/1989 | Murai et al. |
| 4,970,186 | A | 11/1990 | Terano et al. |
| 5,064,799 | A | 11/1991 | Monte et al. |
| 5,106,807 | A | 4/1992 | Morini et al. |
| 5,106,926 | A | 4/1992 | Fisinger et al. |
| 5,118,768 | A | 6/1992 | Job et al. |
| 5,130,284 | A | 7/1992 | Terano et al. |
| 5,134,209 | A | 7/1992 | Job et al. |
| 5,139,985 | A | 8/1992 | Barbe' et al. |
| 5,164,352 | A | 11/1992 | Job et al. |
| 5,229,477 | A | 7/1993 | Job et al. |
| 5,270,276 | A | 12/1993 | Job |
| 5,459,116 | A | 10/1995 | Ro et al. |
| 5,543,458 | A | 8/1996 | Hoxmeier et al. |
| 5,550,194 | A | 8/1996 | Hoxmeier et al. |
| 5,633,419 | A | 5/1997 | Spencer et al. |
| 6,100,351 | A | 8/2000 | Sun et al. |
| 6,228,792 | B1 | 5/2001 | Carney |
| 6,329,315 | B1 | 12/2001 | Denton et al. |
| 6,417,299 | B1 | 7/2002 | Ford et al. |
| 6,436,864 | B1 | 8/2002 | Tagge |
| 6,958,378 | B2 | 10/2005 | Yang et al. |
| 7,153,803 | B2 | 12/2006 | Zhu et al. |
| 7,560,521 | B2 | 7/2009 | Collina et al. |
| 7,618,913 | B2 | 11/2009 | Xu et al. |
| 7,871,952 | B1 | 1/2011 | Nagy et al. |
| 8,993,693 | B2 | 3/2015 | Lu et al. |
| 9,487,608 | B2 | 11/2016 | Lu et al. |
| 9,988,475 | B2 | 6/2018 | Chen et al. |
| 2004/0068064 | A1 | 4/2004 | Yang et al. |
| 2007/0259777 | A1 | 11/2007 | Kang et al. |
| 2011/0082268 | A1 | 4/2011 | Nagy et al. |
| 2011/0082270 | A1 | 4/2011 | Nagy et al. |
| 2013/0137827 | A1 | 5/2013 | Jorgensen et al. |
| 2016/0355615 | A1* | 12/2016 | Zuideveld ............. C08F 210/16 |
| 2017/0058060 | A1 | 3/2017 | Wang et al. |
| 2019/0002610 | A1 | 1/2019 | Toltsch et al. |
| 2019/0211119 | A1 | 7/2019 | Wang et al. |
| 2019/0256618 | A1 | 8/2019 | Chen et al. |
| 2020/0002443 | A1* | 1/2020 | Hanik ..................... C08F 4/646 |

FOREIGN PATENT DOCUMENTS

| | | | |
|---|---|---|---|
| JP | 61055103 | 3/1986 | |
| JP | 61268704 | 11/1986 | |
| JP | 63308033 | 12/1988 | |
| JP | 2013189590 A | 9/2013 | |
| KR | 199426081 | 12/1994 | |
| KR | 1999010007 | 2/1999 | |
| NO | 9920694 | 4/1999 | |
| WO | 1997048742 | 12/1997 | |
| WO | 2000046025 | 8/2000 | |
| WO | 2002038623 | 5/2002 | |
| WO | 2013137827 | 9/2013 | |
| WO | 2017040127 | 3/2017 | |
| WO | 2019241044 | 12/2019 | |
| WO | WO-2020069847 A1 * | 4/2020 | ............ B01J 27/138 |

OTHER PUBLICATIONS

Kim, I. "Ethylene polymerization over multimetallic catalysts. 1. Effect of catalyst composition." Polymer-Korea 20.1 (1996): 33-43.*
Proto, Antonio, et al. "Isotactic-specific polymerization of propene with supported catalysts in the presence of different modifiers." Macromolecules 23.11 (1990): 2904-2907.*
PCT/US2021/028585, International Search Report and Written Opinion with a mailing date of Sep. 10, 2021.
Busico et al. High-Resolution 13C NMR Configurational Analysis of Polypropylene Made with MgCl2-Supported ZieglerNatta Catalysts. The "Model" System MgCl2/TiCl42,6-Dimethylpyridine/Al (C2H5) 3 Macromolecules, 1999, 32 (13).
Ferreira et al. "Effect of different donors on kinetics of Zn catalysts and molecular weight of the obtained polypropylene" vol. 150, Issues 1-2, Dec. 28, 1999, pp. 53-69.

* cited by examiner

FIG. 1

Table 1C. iCCD Results Showing Effects of EEDC-1 on PCAT-1.

| Ex. | iCCD Results | | | | | | | | | | | |
|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE1 | 0.05 | 0.60 | 0.35 | 29.7 | 99.2 | 13,974 | 41,851 | 122,280 | 0.34 | 0 | 0.11 | 1 | 1 |
| IE1 | 0.04 | 0.60 | 0.36 | 29.7 | 99.4 | 39,583 | 51,677 | 110,264 | 0.47 | 37 | 0.36 | 1.23 | 1.00 |
| IE2 | 0.05 | 0.60 | 0.35 | 29.8 | 99.4 | 43,031 | 61,298 | 123,141 | 0.50 | 45 | 0.35 | 1.46 | 1.00 |
| IE3 | 0.05 | 0.59 | 0.36 | 29.9 | 99.6 | 38,902 | 63,975 | 132,680 | 0.48 | 41 | 0.29 | 1.53 | 0.98 |

FIG. 2

Table 2C. iCCD Results Showing Effects of EEDC-1 on Pre-Treated PCAT-1.

| Ex. | iCCD Results | | | | | | | | | | | |
|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE1 | 0.05 | 0.60 | 0.35 | 29.7 | 99.2 | 13,974 | 41,851 | 122,280 | 0.34 | 0 | 0.11 | 1 | 1 |
| IE4 | 0.03 | 0.57 | 0.39 | 29.8 | 99.6 | 28,255 | 58,090 | 111,453 | 0.52 | 52 | 0.25 | 1.40 | 0.95 |
| IE5 | 0.03 | 0.56 | 0.41 | 29.9 | 99.7 | 33,116 | 65,531 | 120,744 | 0.54 | 59 | 0.27 | 1.58 | 0.94 |

FIG. 3

Table 3C. iCCD Results Showing Effects of addition mode of components of catalyst system.

| Ex. | iCCD Results | | | | | | | | | | | | |
|---|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE2 | 0.04 | 0.60 | 0.36 | 29.7 | 99.2 | 13,731 | 37,695 | 120,740 | 0.31 | 0 | 0.11 | 1.00 | 1.00 |
| IE6 | 0.04 | 0.59 | 0.37 | 29.6 | 99.4 | 25,728 | 52,938 | 107,100 | 0.49 | 58 | 0.24 | 1.40 | 0.98 |
| IE7 | 0.04 | 0.61 | 0.35 | 29.7 | 99.4 | 27,816 | 52,117 | 105,328 | 0.49 | 58 | 0.26 | 1.38 | 1.01 |
| IE8 | 0.04 | 0.61 | 0.36 | 29.7 | 99.4 | 34,553 | 47,431 | 103,423 | 0.46 | 47 | 0.33 | 1.26 | 1.01 |

FIG. 4

Table 4C. iCCD Results Showing Effects of molecular structure of EEDC on precatalyst/catalyst systems

| Ex. | iCCD Results | | | | | | | | | | | | |
|---|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE2 | 0.04 | 0.60 | 0.36 | 29.7 | 99.2 | 13,731 | 37,695 | 120,740 | 0.31 | 0 | 0.11 | 1.00 | 1.00 |
| IE9 | 0.03 | 0.59 | 0.38 | 29.8 | 99.4 | 26,316 | 43,589 | 114,794 | 0.38 | 22 | 0.23 | 1.16 | 0.98 |
| IE10 | 0.02 | 0.59 | 0.39 | 29.9 | 99.4 | 32,507 | 48,781 | 107,351 | 0.45 | 46 | 0.30 | 1.29 | 0.98 |
| IE11 | 0.02 | 0.59 | 0.39 | 29.9 | 99.4 | 22,577 | 46,915 | 109,278 | 0.43 | 38 | 0.21 | 1.24 | 0.98 |
| IE12 | 0.02 | 0.60 | 0.37 | 30.0 | 99.3 | 18,033 | 42,524 | 112,495 | 0.38 | 21 | 0.16 | 1.13 | 1.00 |
| IE13 | 0.02 | 0.59 | 0.39 | 29.9 | 99.3 | 28,071 | 47,716 | 110,016 | 0.43 | 39 | 0.26 | 1.27 | 0.98 |
| IE14 | 0.03 | 0.60 | 0.37 | 29.9 | 99.5 | 25,861 | 46,085 | 106,412 | 0.43 | 39 | 0.24 | 1.22 | 1.00 |
| IE15 | 0.02 | 0.60 | 0.38 | 30.0 | 99.3 | 20,225 | 40,728 | 110,295 | 0.37 | 18 | 0.18 | 1.08 | 1.00 |
| IE16 | 0.03 | 0.61 | 0.36 | 29.8 | 98.9 | 17,749 | 42,518 | 89,429 | 0.48 | 52 | 0.20 | 1.13 | 1.02 |
| IE17 | 0.03 | 0.61 | 0.36 | 29.8 | 99.2 | 21,197 | 43,448 | 116,894 | 0.37 | 19 | 0.18 | 1.15 | 1.01 |
| IE51 | 0.02 | 0.55 | 0.43 | 30.2 | 99.6 | 14,295 | 41,058 | 99,608 | 0.41 | 32 | 0.14 | 1.09 | 0.92 |
| IE52 | 0.02 | 0.55 | 0.43 | 30.0 | 99.4 | 18,054 | 47,621 | 105,186 | 0.45 | 45 | 0.17 | 1.10 | 0.88 |

FIG. 4 Continued

| | | | | | | | | | | | | | |
|---|---|---|---|---|---|---|---|---|---|---|---|---|---|
| IE53 | 0.04 | 0.62 | 0.34 | 29.8 | 99.1 | 16,973 | 37,350 | 125,029 | 0.30 | -4 | 0.14 | 0.99 | 1.04 |
| IE54 | 0.03 | 0.60 | 0.37 | 29.8 | 99.2 | 15,534 | 38,374 | 123,623 | 0.31 | -1 | 0.13 | 1.02 | 1.00 |
| IE55 | 0.03 | 0.61 | 0.36 | 29.9 | 99.3 | 23,550 | 41,444 | 123,673 | 0.34 | 7 | 0.19 | 1.10 | 1.02 |
| IE56 | 0.04 | 0.61 | 0.36 | 29.9 | 99.4 | 16,424 | 42,897 | 118,080 | 0.36 | 16 | 0.14 | 1.14 | 1.01 |
| IE18 | 0.03 | 0.61 | 0.35 | 30.0 | 99.3 | 15,077 | 37,433 | 122,201 | 0.31 | 0 | 0.12 | 0.99 | 1.02 |
| IE19 | 0.03 | 0.60 | 0.37 | 30.1 | 99.3 | 24,125 | 44,570 | 111,509 | 0.40 | 29 | 0.22 | 1.18 | 1.00 |
| IE20 | 0.03 | 0.63 | 0.34 | 30.0 | 99.0 | 19,125 | 42,664 | 125,366 | 0.34 | 10 | 0.15 | 1.13 | 1.05 |
| IE21 | 0.02 | 0.60 | 0.38 | 30.1 | 99.2 | 23,754 | 44,595 | 115,419 | 0.39 | 25 | 0.21 | 1.18 | 1.00 |
| IE22 | 0.02 | 0.60 | 0.39 | 30.1 | 99.0 | 15,129 | 39,009 | 119,378 | 0.33 | 5 | 0.13 | 1.03 | 1.00 |
| IE23 | 0.03 | 0.62 | 0.35 | 30.0 | 99.0 | 14,073 | 39,570 | 128,744 | 0.31 | -1 | 0.11 | 1.05 | 1.03 |

FIG. 5

Table 5C. iCCD Results Showing Effects of different EEDCs on PCAT-4.

| Ex. | iCCD Results | | | | | | | | | | | |
|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE3 | 0.03 | 0.61 | 0.37 | 29.7 | 98.9 | 18,976 | 45,780 | 122,435 | 0.37 | 0 | 0.15 | 1 | 1 |
| IE24 | 0.03 | 0.61 | 0.36 | 29.9 | 99.1 | 39,617 | 55,218 | 109,806 | 0.50 | 34 | 0.36 | 1.21 | 1.01 |
| IE25 | 0.04 | 0.62 | 0.35 | 29.9 | 99.1 | 36,647 | 60,347 | 111,943 | 0.54 | 44 | 0.33 | 1.32 | 1.02 |
| IE26 | 0.04 | 0.62 | 0.34 | 29.8 | 99.1 | 44,702 | 57,937 | 105,878 | 0.55 | 46 | 0.42 | 1.27 | 1.02 |
| E27 | 0.05 | 0.63 | 0.32 | 29.6 | 99.0 | 44,703 | 58,893 | 107,614 | 0.55 | 46 | 0.42 | 1.29 | 1.04 |
| IE28 | 0.04 | 0.63 | 0.33 | 29.7 | 99.1 | 48,702 | 63,659 | 106,286 | 0.60 | 60 | 0.46 | 1.39 | 1.04 |
| IE29 | 0.04 | 0.63 | 0.34 | 29.8 | 99.1 | 53,756 | 69,520 | 106,312 | 0.65 | 75 | 0.51 | 1.52 | 1.03 |
| IE30 | 0.03 | 0.63 | 0.34 | 29.8 | 99.1 | 53,778 | 71,652 | 108,589 | 0.66 | 76 | 0.50 | 1.57 | 1.03 |
| IE31 | 0.03 | 0.61 | 0.37 | 29.7 | 0.0 | 23,350 | 42,162 | 88,827 | 0.47 | 27 | 0.26 | 0.92 | 1.00 |
| IE32 | 0.03 | 0.64 | 0.33 | 29.7 | 98.6 | 26,233 | 59,842 | 104,855 | 0.57 | 53 | 0.25 | 1.31 | 1.05 |
| IE33 | 0.02 | 0.62 | 0.35 | 29.6 | 98.8 | 30,495 | 58,470 | 104,602 | 0.56 | 49 | 0.29 | 1.28 | 1.02 |
| CE4 | 0.02 | 0.63 | 0.35 | 29.6 | 98.8 | 25,035 | 56,866 | 113,998 | 0.50 | 33 | 0.22 | 1.24 | 1.03 |
| CE5 | 0.02 | 0.60 | 0.39 | 29.8 | 98.8 | 19,851 | 58,715 | 105,287 | 0.56 | 49 | 0.19 | 1.28 | 0.98 |

FIG. 5 Continued

| | | | | | | | | | | | | | |
|---|---|---|---|---|---|---|---|---|---|---|---|---|---|
| CE6 | 0.02 | 0.58 | 0.40 | 29.8 | 98.9 | 17,002 | 56,486 | 107,847 | 0.52 | 40 | 0.16 | 1.23 | 0.95 |
| IE34 | 0.01 | 0.52 | 0.47 | 29.8 | 99.2 | 22,543 | 47,065 | 95,674 | 0.49 | 32 | 0.24 | 1.03 | 0.85 |
| IE35 | 0.03 | 0.63 | 0.34 | 29.6 | 98.8 | 28,362 | 54,864 | 105,802 | 0.52 | 39 | 0.27 | 1.20 | 1.03 |
| IE36 | 0.03 | 0.61 | 0.36 | 29.8 | 98.9 | 30,396 | 57,201 | 101,793 | 0.56 | 50 | 0.30 | 1.25 | 1.00 |
| IE37 | 0.02 | 0.61 | 0.37 | 29.7 | 99.0 | 29,573 | 57,067 | 112,862 | 0.51 | 35 | 0.26 | 1.25 | 1.00 |
| IE38 | 0.02 | 0.59 | 0.39 | 29.7 | 99.0 | 31,899 | 63,229 | 108,685 | 0.58 | 56 | 0.29 | 1.38 | 0.97 |
| IE39 | 0.02 | 0.61 | 0.37 | 29.8 | 98.9 | 26,986 | 61,122 | 108,989 | 0.56 | 50 | 0.25 | 1.34 | 1.00 |
| IE40 | 0.02 | 0.59 | 0.38 | 29.8 | 98.9 | 13,293 | 48,421 | 125,693 | 0.39 | 3 | 0.11 | 1.06 | 0.97 |
| IE41 | 0.02 | 0.59 | 0.39 | 29.7 | 98.9 | 11,668 | 53,586 | 130,277 | 0.41 | 10 | 0.09 | 1.17 | 0.97 |
| IE42 | 0.01 | 0.55 | 0.43 | 29.8 | 99.1 | 14,390 | 57,316 | 130,054 | 0.44 | 18 | 0.11 | 1.25 | 0.90 |

FIG. 6

Table 6C. iCCD Results Showing Effects of EEDC-1 on PCAT-5.

| Ex. | iCCD Results | | | | | | | | | | | | |
|---|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE7 | 0.03 | 0.35 | 0.62 | 30.0 | 99.9 | 24,816 | 69,600 | 198,870 | 0.35 | 0 | 0.12 | 1 | 1 |
| IE43 | 0.02 | 0.37 | 0.61 | 30.0 | 99.9 | 18,091 | 100,341 | 205,831 | 0.49 | 39 | 0.09 | 1.44 | 1.05 |
| IE44 | 0.02 | 0.37 | 0.61 | 30.0 | 99.9 | 23,907 | 108,158 | 208,372 | 0.52 | 48 | 0.11 | 1.55 | 1.04 |
| IE45 | 0.02 | 0.37 | 0.61 | 30.1 | 100.0 | 19,376 | 112,003 | 208,802 | 0.54 | 53 | 0.09 | 1.61 | 1.04 |
| IE46 | 0.02 | 0.37 | 0.60 | 30.1 | 100.1 | 19,279 | 117,891 | 206,898 | 0.57 | 63 | 0.09 | 1.69 | 1.04 |

FIG. 7

Table 7C. iCCD Results Showing Effects of EEDC-1 on PCAT-6.

| Ex. | iCCD Results | | | | | | | | | | | | | |
|---|---|---|---|---|---|---|---|---|---|---|---|---|---|---|
| | Wt1 | Wt2 | Wt3 | Tp1 (°C) | Tp2 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE8 | 0.01 | 0.43 | 0.56 | 30.1 | 87.0 | 99.6 | 23,858 | 55,948 | 165,502 | 0.34 | 0 | 0.14 | 1 | 1 |
| IE47 | 0.01 | 0.42 | 0.58 | 30.1 | 87.0 | 99.5 | 27,113 | 69,128 | 136,417 | 0.51 | 50 | 0.20 | 1.24 | 0.97 |
| IE48 | 0.01 | 0.43 | 0.57 | 30.1 | 87.0 | 99.4 | 32,239 | 73,327 | 135,302 | 0.54 | 60 | 0.24 | 1.31 | 0.99 |
| IE49 | 0.01 | 0.48 | 0.51 | 30.0 | 87.0 | 99.3 | 31,203 | 71,602 | 131,158 | 0.55 | 61 | 0.24 | 1.28 | 1.11 |
| IE50 | 0.01 | 0.45 | 0.54 | 30.1 | 87.0 | 99.5 | 49,710 | 81,635 | 138,402 | 0.59 | 74 | 0.36 | 1.46 | 1.04 |

FIG. 8

Table 8C. iCCD Results Showing Effects of EEDC-17 on PCAT-1.

| Ex. | iCCD Results | | | | | | | | | | | |
|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1 /Mw3 | Mw2/ Mw2(0) | Wt2/ Wt2(0) |
| CE1 | 0.05 | 0.60 | 0.35 | 29.7 | 99.2 | 13,974 | 41,851 | 122,280 | 0.34 | 0 | 0.11 | 1 | 1 |
| CE9 | 0.02 | 0.52 | 0.46 | 30.0 | 99.2 | 21,310 | 42,036 | 100,015 | 0.42 | 23 | 0.21 | 0.94 | 0.86 |
| CE10 | 0.02 | 0.43 | 0.55 | 30.0 | 99.5 | 15,263 | 43,420 | 102,425 | 0.42 | 24 | 0.15 | 0.98 | 0.72 |
| CE11 | 0.02 | 0.42 | 0.57 | 29.9 | 99.6 | 9,457 | 42,669 | 102,232 | 0.42 | 22 | 0.09 | 0.96 | 0.69 |

FIG. 9

Table 9C. iCCD Results Showing Effects of EEDC-18 on PCAT-1.

| Ex. | iCCD Results | | | | | | | | | | | | |
|---|---|---|---|---|---|---|---|---|---|---|---|---|---|
| | Wt1 | Wt2 | Wt3 | Tp1 (°C) | Tp3 (°C) | Mw1 (g/mol) | Mw2 (g/mol) | Mw3 (g/mol) | Mw2 /Mw3 | Δ(Mw2 /Mw3) (%) | Mw1/ Mw3 | Mw2/ Mw2(0) | Wt2/ Wt2(0) |
| CE1 | 0.05 | 0.60 | 0.35 | 29.7 | 99.2 | 13,974 | 41,851 | 122,280 | 0.34 | 0 | 0.11 | 1 | 1 |
| CE12 | 0.01 | 0.38 | 0.61 | 29.9 | 99.8 | 22,471 | 43,425 | 106,600 | 0.41 | 19 | 0.21 | 0.92 | 0.63 |
| CE13 | 0.01 | 0.38 | 0.61 | 29.9 | 99.8 | 14,439 | 47,787 | 109,060 | 0.44 | 28 | 0.13 | 1.01 | 0.63 |
| CE14 | 0.02 | 0.36 | 0.62 | 29.9 | 100.0 | 13,651 | 51,343 | 110,561 | 0.46 | 36 | 0.12 | 1.09 | 0.60 |

FIG. 10

Table 10. LLDPE Polymer Properties Showing Effects of EEDC-1 on PCAT-1 or PCAT-4.

| Example | TEA/Ti (Mol/ Mol) | EEDC/Ti (Mol/ Mol) | $I_2$ (g/10 min) | $I_{21}$ /I2 | $\Delta(I_{21}/I_2)$ | Mw (g/mol) | Mw/ Mn | Mz/ Mw | Δ(Mz/ Mw) (%) | CDI | Δ(CDI) (%) | Hexane Extract. Content (%) | Δ(Hexane Extractable Content) (%) |
|---|---|---|---|---|---|---|---|---|---|---|---|---|---|
| CE-P1 | 60.0 | 0 | 1.1 | 29.8 | 0 | 124,627 | 5.10 | 3.88 | 0 | -2.19 | 0 | 1.5 | 0 |
| IE-P1 | 60.3 | 2.96 | 1.0 | 25.2 | -4.6 | 122,795 | 4.07 | 3.07 | -21 | -1.62 | 26 | 0.78 | -48 |
| CE-P6 | 53 | 0 | 1.0 | 29.4 | 0 | 130,460 | 5.06 | 3.33 | 0 | -1.66 | 0 | 1.21 | 0 |
| IE-P4 | 86 | 22.0 | 1.0 | 24.4 | -5.0 | 141,452 | 5.49 | 4.08 | 23 | -0.92 | 44 | 0.67 | -33 |
| CE-P7 | 159 | 0 | 0.94 | 31.7 | 0 | 126,201 | 4.59 | 2.91 | 0 | -2.21 | 0 | 1.45 | 0 |
| IE-P5 | 222 | 26.9 | 1.0 | 24.6 | -7.1 | 125,750 | 4.49 | 2.78 | -5 | -1.17 | 47 | 0.81 | -19 |

FIG. 11

Table 11. HDPE Polymer Properties Showing Effects of different EEDCs on PCAT-1 or PCAT-4.

| Ex. | TEA/Ti (Mol/ Mol) | EEDC/Ti (Mol/ Mol) | Resin Density (g/cc) | $I_2$ (g/10 min) | $I_{21}$ /$I_2$ | Δ($I_{21}$ /$I_2$) | Mw (g/mol) | Mw/ Mn | Mz/ Mw | Δ(Mz/ Mw) (%) | CDI | Δ(CDI) (%) |
|---|---|---|---|---|---|---|---|---|---|---|---|---|
| CE-P2 | 38.8 | 0 | 0.9488 | 3.7 | 24.3 | 0 | 92,081 | 4.56 | 4.20 | 0 | -0.30 | 0 |
| IE-P2 | 49.4 | 2.17 | 0.9486 | 3.6 | 22.9 | -1.4 | 87,807 | 4.22 | 3.24 | -26 | -0.30 | 0 |
| CE-P3 | 51.8 | 3.24 | 0.9489 | 3.6 | 21.4 | -2.8 | 84,840 | 3.91 | 2.94 | -35 | -0.40 | -35 |
| CE-P4 | 36.7 | 0 | 0.9524 | 9.6 | 24.1 | 0 | 70,644 | 4.52 | 4.22 | 0 | -0.39 | 0 |
| IE-P3 | 44.5 | 2.20 | 0.9523 | 9.3 | 22.2 | -1.9 | 66,544 | 4.13 | 3.05 | -32 | -0.33 | 14 |
| CE-P5 | 51.8 | 3.49 | 0.9522 | 10.1 | 22.6 | -1.5 | 65,130 | 3.86 | 2.79 | -39 | -0.54 | -39 |
| CE-P8 | 191 | 0 | 0.9520 | 10.3 | 25.8 | 0 | 71,169 | 4.56 | 4.17 | 0 | -0.22 | 0 |
| IE-P6 | 187 | 22.6 | 0.9515 | 10.1 | 21.7 | -4.1 | 67,994 | 3.98 | 3.06 | -37 | -0.30 | -36 |

ZIEGLER-NATTA (PRO)CATALYST SYSTEMS MADE WITH AZAHETEROCYCLIC COMPOUND

FIELD

Ziegler-Natta (pro)catalyst systems made with an external electron donor compound, methods of synthesis of same, methods of olefin polymerization using same, and polyolefin polymers made thereby.

INTRODUCTION

Patent application publications and patents in or about the field include EP 0 136 163; EP 0 193 280; EP 0 208 524; EP 0 506 704; JP 61-055103 A; JP 61-268704 A; JP 63-308033 A; KR 1994-026081 A; KR 1999-010007 A; U.S. Pat. Nos. 4,107,413; 4,136,243; 4,252,670; 4,263,168; 4,301,029; 4,324,691; 4,381,252; 4,410,672; 4,330,649; 4,381,252; 4,468,477; 4,471,066; 4,477,639; 4,496,660; 4,518,706; 4,716,206; 4,816,433; 4,826,794; 4,829,037; 4,847,227; 4,496,660; 4,826,794; 4,970,186; 5,064,799; 5,106,807; 5,106,926; 5,118,768; 5,130,284; 5,134,209; 5,139,985; 5,164,352; 5,229,477; 5,270,276; 5,459,116; 5,543,458; 5,550,194; 5,633,419; 6,100,351; 6,228,792 B1; U.S. Pat. No. 6,329,315 B1; U.S. Pat. No. 6,436,864 B1; U.S. Pat. No. 6,958,378 B2; U.S. Pat. No. 7,153,803 B2; U.S. Pat. No. 7,560,521 B2; U.S. Pat. No. 7,618,913 B2; U.S. Pat. No. 7,871,952 B1; U.S. Pat. No. 8,993,693 B2; U.S. Pat. No. 9,487,608 B2; U.S. Pat. No. 9,988,475 B2; US 2007/0259777 A1; US 2011/0082268 A1; US 2011/0082270 A1; US 2013/0137827 A1; US 2019/0002610 A1; WO 99/20694; WO 00/46025 A1; and WO 2019/241044 A1.

SUMMARY

We discovered an external electron donor-modified Ziegler-Natta procatalyst system, an external electron donor compound-modified Ziegler-Natta catalyst system made therefrom, methods of making same, methods of polymerizing olefin monomers using the catalyst system, and polyolefin polymers made thereby.

BRIEF DESCRIPTION OF THE DRAWINGS

Pursuant to 37 C.F.R. §§ 1.58 and 1.84(d), Tables 1C, 2C, 3C, 4C, 5C, 6C, 7C, 8C, 9C, 10, and 11 are shown in landscape orientation in FIGS. 1 to 11, respectively.

FIG. 1 is Table 1C containing improved comonomer content distribution (iCCD) results showing effects of EEDC-1 on PCAT-1.

FIG. 2 is Table 2C containing iCCD results showing effects of EEDC-1 on PCAT-1 that has been pre-treated with the EEDC-1.

FIG. 3 is Table 3C containing iCCD results showing effects of addition mode of components of catalyst system.

FIG. 4 is Table 4C containing iCCD results showing effects of molecular structure of EEDC on procatalyst system and catalyst system.

FIG. 5 is Table 5C containing iCCD results showing effects of different EEDCs on PCAT-4.

FIG. 6 is Table 6C containing iCCD results showing effects of EEDC-1 on PCAT-5.

FIG. 7 is Table 7C containing iCCD results showing effects of EEDC-1 on PCAT-6.

FIG. 8 is Table 8C containing iCCD results showing effects of EEDC-17 on PCAT-1.

FIG. 9 is Table 9C containing iCCD results showing effects of EEDC-18 on PCAT-1.

FIG. 10 is Table 10 containing linear low-density polyethylene (LLDPE) polymer properties showing effects of EEDC-1 on PCAT-1 or PCAT-4.

FIG. 11 is Table 11 containing high-density polyethylene (HDPE) polymer properties showing effects of different EEDCs on PCAT-1 or PCAT-4.

DETAILED DESCRIPTION

An external electron donor-modified Ziegler-Natta procatalyst system, an external electron donor compound-modified Ziegler-Natta catalyst system made therefrom, methods of making same, methods of polymerizing olefin monomers using the catalyst system, and polyolefin polymers made thereby.

A procatalyst system consisting essentially of a blend of a pre-made solid procatalyst and an azaheterocycle. The procatalyst system is a Ziegler-Natta-type procatalyst system that is suitable for making a Ziegler-Natta-type olefin polymerization catalyst, which is made by contacting the procatalyst system with an activator. Based upon how the azaheterocycle is used and how it is formulated with the pre-made solid procatalyst in the procatalyst system, the azaheterocycle functions as the external electron donor compound (EEDC) in the procatalyst system. The pre-made solid procatalyst consists essentially of a titanium compound, magnesium chloride solids, and optionally a silica. The magnesium chloride solids consist essentially of $MgCl_2$ and, optionally, at least one of a cyclic ($C_2$-$C_6$)ether, a ($C_1$-$C_6$)alcohol, or a hydroxyl-substituted cyclic ($C_3$-$C_7$) ether. The magnesium chloride solids are either free of an internal electron donor compound or internally contain an internal electron donor compound that consists of the at least one of a cyclic ($C_2$-$C_6$)ether, a ($C_1$-$C_6$)alcohol, or a hydroxyl-substituted cyclic ($C_3$-$C_7$)ether. The procatalyst system is free of any other electron donor organic compound. The procatalyst system, when activated with the activator, makes the catalyst system.

The method of polymerization may comprise a gas-phase polymerization run under gas-phase polymerization conditions in a gas-phase polymerization reactor, a slurry-phase polymerization run under slurry-phase polymerization conditions in a slurry-phase polymerization reactor, a solution-phase polymerization run under solution-phase polymerization conditions in a solution-phase polymerization reactor, or a combination of any two thereof. For example, the combination may comprise two sequential gas-phase polymerizations, or the combination may comprise a slurry-phase polymerization followed by a gas-phase polymerization.

The polyolefin polymer made by the polymerization method has at least one improved property relative to a polyolefin polymer made by a comparative Ziegler-Natta catalyst system that lacks the azaheterocycle as an external electron donor.

Additional inventive aspects follow; some are numbered for easy cross-referencing.

Aspect 1. A procatalyst system suitable for making an olefin polymerization catalyst and consisting essentially of a blend of (A) a pre-made solid procatalyst and (B) an azaheterocycle; wherein the (A) pre-made solid procatalyst consists essentially of a titanium compound, magnesium chloride solids, and optionally a silica; wherein the magnesium chloride solids consist essentially of $MgCl_2$ and, optionally, at least one of a cyclic ($O_2$—$C_6$)ether, a ($C_1$-$C_6$) alcohol, or a hydroxyl-substituted cyclic ($C_3$-$C_7$)ether; and wherein the procatalyst system is free of any other electron donor organic compound. Based upon how the (B) azaheterocycle is used and how it is formulated with the (A) pre-made solid procatalyst in the procatalyst system, the (B) azaheterocycle functions as the external electron donor compound (EEDC) in the procatalyst system. The titanium compound is supported by or on the magnesium chloride solids and, if any silica is present, by or on the silica.

Aspect 2. The procatalyst system of aspect 1 wherein the (B) azaheterocycle is—an aromatic azaheterocycle of formula (I):

(I)

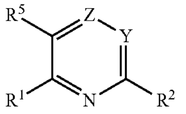

or a saturated azaheterocycle of formula (II):

(II)

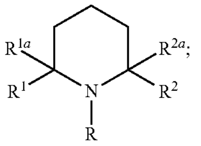

wherein Y is N or C—$R^3$; wherein Z is N or C—$R^4$; wherein R is H or an unsubstituted ($C_1$-$C_{10}$)alkyl; wherein each of $R^1$, $R^2$, $R^3$, $R^4$, $R^5$, $R^{1a}$, and $R^{2a}$ independently is H, a halogen atom, —OH, an unsubstituted ($C_1$-$C_{10}$)alkyl group, a halo-substituted ($C_1$-$C_{10}$)alkyl group, or a hydroxyl-substituted ($C_1$-$C_{10}$)alkyl group, or formula (I) is defined by any one of limitations (i) to (iv): (i) $R^1$ and $R^5$ are taken together to be a divalent group that is 1,3-butadien-1,4-diyl, (ii) when Y is C—$R^3$, $R^2$ and $R^3$ are taken together to be a divalent group that is 1,3-butadien-1,4-diyl, (iii) wherein in formula (I) when Z is C—$R^4$, $R^4$ and $R^5$ are taken together to be a divalent group that is 1,3-butadien-1,4-diyl, or (iv) both limitation (i) and (ii). In some embodiments at least one of $R^1$, $R^2$, $R^3$, $R^4$, $R^5$, $R^{1a}$, and $R^{2a}$, alternatively at least $R^1$ is a halogen atom, —OH, an unsubstituted ($C_1$-$C_{10}$)alkyl group, a halo-substituted ($C_1$-$C_{10}$)alkyl group, or a hydroxyl-substituted ($C_1$-$C_{10}$)alkyl group; alternatively at least one of $R^1$, $R^2$, $R^3$, $R^4$, $R^5$, $R^{1a}$, and $R^{2a}$, alternatively at least $R^1$ is a halogen atom or —OH; alternatively at least one of $R^1$, $R^2$, $R^3$, $R^4$, $R^5$, Ria, and $R^{2a}$, alternatively at least $R^1$ is an unsubstituted ($C_1$-$C_{10}$)alkyl group, a halo-substituted ($C_1$-$C_{10}$)alkyl group, or a hydroxyl-substituted ($C_1$-$C_{10}$)alkyl group; alternatively at least one of $R^1$, $R^2$, $R^3$, $R^4$, $R^5$, $R^{1a}$, and $R^{2a}$, alternatively at least $R^1$ is an unsubstituted ($C_1$-$C_{10}$)alkyl group.

Aspect 3. The procatalyst system of any one of aspects 1 to 2 wherein the magnesium chloride solids are free of the at least one of a cyclic ($C_2$-$C_6$)ether, a ($C_1$-$C_6$)alcohol, or a hydroxyl-substituted cyclic ($C_3$-$C_7$)ether.

Aspect 4. The procatalyst system of any one of aspects 1 to 2 wherein the magnesium chloride, solids consist essentially of $MgCl_2$ and the at least one of a cyclic ($C_2$-$C_6$)ether, a ($C_1$-$C_6$)alcohol, or a hydroxyl-substituted cyclic ($C_3$-$C_7$) ether. In some embodiments the at least one internal electron donor compound is selected from the cyclic ($C_2$-$C_6$)ether and the ($C_1$-$C_6$)alcohol; alternatively the cyclic ($C_2$-$C_6$)ether and the hydroxyl-substituted cyclic ($C_3$-$C_7$)ether; alternatively the ($C_1$-$C_6$)alcohol and the hydroxyl-substituted cyclic ($C_3$-$C_7$)ether; alternatively the cyclic ($C_2$-$C_6$)ether; alternatively the ($C_1$-$C_6$)alcohol; alternatively the hydroxyl-substituted cyclic ($C_3$-$C_7$)ether.

Aspect 5. The procatalyst system of any one of aspects 1 to 4 wherein the titanium compound is at least one compound of formula (III): $TiX_4$ (III), wherein each X independently is Cl, Br, I, or a ($C_1$-$C_6$)alkoxy. In some aspects each X is Cl; alternatively each X is a ($C_1$-$C_6$)alkoxy, alternatively a ($C_4$-$C_6$)alkoxy.

Aspect 6. The procatalyst system of any one of aspects 1 to 5 further consisting essentially of a ligand-metal complex of formula (IV): $MX_4$ (IV), wherein M is Hf or Zr and each X independently is Cl, Br, I, or a ($C_1$-$C_6$)alkoxy.

Aspect 7. A method of synthesizing a procatalyst system, the method comprising drying a mixture consisting essentially of a solution and, optionally, a silica, and being free of (B) an azaheterocycle and any other electron donor organic compound, wherein the solution consists essentially of a titanium compound, magnesium chloride, and, optionally, at least one of a cyclic ($C_2$-$C_6$)ether and a ($C_1$-$C_6$)alcohol mixed in a hydrocarbon solvent; thereby removing the hydrocarbon solvent from the mixture and crystallizing the magnesium chloride so as to give (A) a pre-made solid procatalyst; and contacting the (A) pre-made solid procatalyst with the (B) azaheterocycle; thereby making the blend of the procatalyst system of any one of aspects 1 to 6.

Aspect 8. A method of making a catalyst system suitable for polymerizing an olefin, the method comprising contacting the procatalyst system of any one of aspects 1 to 6, or the procatalyst system made by the method of aspect 7, with an activating effective amount of (C) an activator, thereby making the catalyst system; wherein the catalyst system is free of the any other electron donor organic compound and is suitable for polymerizing an olefin.

Aspect 9. A method of making a catalyst system suitable for polymerizing an olefin, the method comprising simultaneously or sequentially contacting an activating effective amount of (C) an activator, (B) an azaheterocycle, and (A) a pre-made solid procatalyst, thereby making the catalyst system; wherein the (A) pre-made solid procatalyst consists essentially of a titanium compound, magnesium chloride solids, and optionally a silica; wherein the magnesium chloride solids consist essentially of $MgCl_2$ and, optionally, at least one of a cyclic ($C_2$-$C_6$)ether, a ($C_1$-$C_6$)alcohol, or a hydroxyl-substituted cyclic ($C_3$-$C_7$)ether; and wherein the catalyst system is free of the any other electron donor organic compound and is suitable for polymerizing an olefin.

Aspect 10. A catalyst system made by the method of aspect 8 or 9. The catalyst system is believed to have functionally-modified or attenuated active sites.

Aspect 11. A method of synthesizing a polyolefin polymer, the method comprising contacting at least one olefin monomer with the catalyst system of aspect 10 under effective polymerization conditions in a polymerization reactor, thereby making the polyolefin polymer.

Aspect 12. The embodiment of any one of aspects 1 to 11 wherein the (B) azaheterocycle is an aromatic azaheterocycle of formula (Ia):

(Ia)

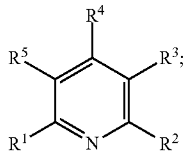

wherein $R^1$ to $R^5$ are as defined for formula (I).

Aspect 13. The embodiment of any one of aspects 1 to 11 wherein the (B) azaheterocycle is an aromatic azaheterocycle of formula (Ib) or (Ic):

(Ib)

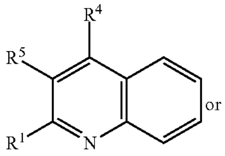

or (Ic)

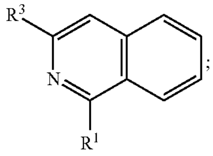

;

wherein $R^1$, $R^3$, $R^4$, and $R^5$ are as defined for formula (I).

Aspect 14. The embodiment of any one of aspects 1 to 11 wherein the (B) azaheterocycle is an aromatic azaheterocycle of formula (Id):

(Id)

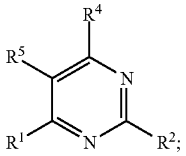

wherein $R^1$, $R^2$, $R^4$, and $R^5$ are as defined for formula (I).

Aspect 15. The embodiment of any one of aspects 1 to 11 wherein the (B) azaheterocycle is an aromatic azaheterocycle of formula (Ie):

(Ie)

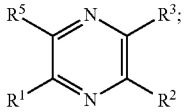

wherein $R^1$, $R^2$, $R^3$, and $R^5$ are as defined for formula (I).

Aspect 16. The embodiment of any one of aspects 1 to 11 wherein the (B) azaheterocycle is the saturated azaheterocycle of formula (II):

(II)

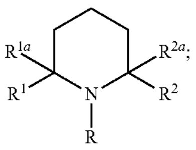

wherein R, $R^1$, $R^{1a}$, $R^2$, and $R^{2a}$ are as defined for formula (II).

Aspect 17. The embodiment of any one of aspects 1, 2, and 4 to 16 wherein the cyclic ($C_2$-$C_6$)ether is selected from the group consisting of: trimethylene oxide; furan; 2,3-dihydrofuran; 2,3-dihydro-5-methylfuran; tetrahydrofuran; 2,2-di(2-tetrahydrofuryl)propane; 2,2-di(2-furanyl)propane; tetrahydropyran; 3,4-dihydro-2H-pyran; and 1,4-dioxane; and/or the ($C_1$-$C_6$)alcohol is a ($C_2$-$C_4$)alcohol.

Aspect 18. A method of making a second catalyst system, the method comprising drying a mixture of a solution of a titanium compound, magnesium chloride, and, optionally, at least one of a cyclic ($C_2$-$C_6$)ether and a ($C_1$-$C_6$)alcohol mixed in a hydrocarbon solvent, and the solution being free of the (B) azaheterocycle and the any other electron donor compound, thereby removing the hydrocarbon solvent from the mixture and crystallizing the magnesium chloride so as to give the (A) pre-made solid procatalyst; and contacting the (A) pre-made solid procatalyst with an activating effective amount of (C) an activator, thereby making a first catalyst system; and contacting the first catalyst system with the (B) azaheterocycle, thereby making the second catalyst system; wherein the catalyst system is free of the any other electron donor compound.

Aspect 19. The embodiment of any one of aspects 1 to 18 wherein the ($C_1$-$C_6$)alcohol is ethanol.

Aspect 20. The embodiment of any one of aspects 1 to 19 wherein the any other electron donor compound is a heterorganic compound consisting of C atoms, H atoms, at least one heteroatom selected from N, P, O, and S, and, optionally Si atom other than the (B) azaheterocycle and, when present, the cyclic ($C_2$-$C_6$)ether and/or ($C_1$-$C_6$)alcohol.

Aspect 21. A method of synthesizing a polyolefin polymer, the method comprising contacting at least one olefin monomer with the catalyst system of any one of aspects 18 to 20 under effective polymerization conditions in a polymerization reactor, thereby making the polyolefin polymer.

Aspect 22. A polyolefin polymer made by the method of aspect 11 or 21.

The procatalyst system. The procatalyst system is a new type of Ziegler-Natta procatalyst system. The procatalyst system consists essentially of the blend of the (A) pre-made solid procatalyst and the (B) azaheterocycle. In this context, the "consists essentially of" (and equivalents thereof such as "consisting essentially of") means that the procatalyst system is free of a nitrogen atom-containing organic compound that is not the (B) azaheterocycle and free of an oxygen-containing organic compound that is not the optional at least one of a cyclic ($C_2$-$C_6$)ether, a ($C_1$-$C_6$)alcohol, or a hydroxyl-substituted cyclic ($C_3$-$C_7$)ether. The procatalyst system is also free of an activator, which otherwise would react with the (A) pre-made solid procatalyst and make the catalyst system. Alternatively or additionally, the procatalyst system, and the catalyst system made therefrom, is free of a silane compound such as an alkoxysilane compound. In some embodiments the procatalyst system, and the catalyst system made therefrom, is free of the nitrogen atom-containing organic compound that is not the (B) azaheterocycle, and free of an oxygen-containing organic compound that is not the optional at least one of a cyclic ($C_2$-$C_6$)ether, a ($C_1$-$C_6$)alcohol, or a hydroxyl-substituted cyclic ($C_3$-$C_7$) ether, and free of the silane compound.

The blend. The blend of the (A) pre-made solid procatalyst and the (B) azaheterocycle means a physical admixture of constituents (A) and (B). Like the procatalyst system, the blend is free of a nitrogen atom-containing organic compound that is not the (B) azaheterocycle and free of an oxygen-containing organic compound that is not the optional at least one of a cyclic ($C_2$-$C_6$)ether, a ($C_1$-$C_6$) alcohol, or a hydroxyl-substituted cyclic ($C_3$-$C_7$)ether. The blend is also free of an activator, which otherwise would react with the (A) pre-made solid procatalyst and make the catalyst system. The blend intrinsically is made by making constituent (A) in the absence of constituent (B), and then physically intermixing (A) and (B) together to give the blend. Thus, the blend may be called a “post-preparation blend” because the blend is made after constituent (A) is prepared or made. Alternatively or additionally, the blend is free of a silane compound such as an alkoxysilane compound. In some embodiments the blend is free of the nitrogen atom-containing organic compound that is not the (B) azaheterocycle, and free of an oxygen-containing organic compound that is not the optional at least one of a cyclic ($C_2$-$C_6$)ether, a ($C_1$-$C_6$)alcohol, or a hydroxyl-substituted cyclic ($C_3$-$C_7$)ether, and free of the silane compound.

The blend of constituents (A) and (B) is distinct compositionally and functionally from a comparative in situ blend made by mixing the titanium compound, a solution of magnesium chloride dissolved in a hydrocarbon solvent and, optionally the at least one of a cyclic ($C_2$-$C_6$)ether, a ($C_1$-$C_6$)alcohol, or a hydroxyl-substituted cyclic ($C_3$-$C_7$) ether, and optionally the silica, in the presence of (B), and then solidifying the magnesium chloride. This is at least in part because the resulting comparative magnesium chloride solids made by the in situ blending would inherently contain trapped (B) azaheterocycle as an internal electron donor compound. But this comparative feature is excluded by the aforementioned consists essentially of. Further, a comparative catalyst system made by contacting the comparative in situ blend with the activator would intrinsically have a different composition and polymerization function than the inventive catalyst system made from the inventive procatalyst system consisting essentially of the inventive blend. This is at least in part because the resulting comparative catalyst system would inherently contain trapped (B) azaheterocycle as an internal electron donor compound.

The (A) pre-made solid procatalyst. The (A) pre-made solid procatalyst consists essentially of a titanium compound, magnesium chloride solids, and optionally a silica; wherein the magnesium chloride solids consist essentially of $MgCl_2$ and, optionally, at least one of a cyclic ($C_2$-$C_6$)ether, a ($C_1$-$C_6$)alcohol, or a hydroxyl-substituted cyclic ($C_3$-$C_7$) ether. The term “pre-made” and the expressions “consist(s) essentially of” are consistent with, and reinforce, the aforementioned descriptions of the procatalyst system and the blend. Like the procatalyst system and the blend, the constituent (A) is free of a nitrogen atom-containing organic compound that is not the (B) azaheterocycle and free of an oxygen-containing organic compound that is not the optional at least one of a cyclic ($C_2$-$C_6$)ether, a ($C_1$-$C_6$) alcohol, or a hydroxyl-substituted cyclic ($C_3$-$C_7$)ether. Alternatively or additionally, the constituent (A) is free of a silane compound such as an alkoxysilane compound. In some embodiments the constituent (A) is free of the nitrogen atom-containing organic compound that is not the (B) azaheterocycle, and free of an oxygen-containing organic compound that is not the optional at least one of a cyclic ($C_2$-$C_6$)ether, a ($C_1$-$C_6$)alcohol, or a hydroxyl-substituted cyclic ($C_3$-$C_7$)ether, and free of the silane compound. The constituent (A) is also free of an activator, which otherwise would react therewith and make the catalyst system.

The constituent (A) is made in the absence of (B) and in the absence of any other electron donor organic compound (not counting the optional at least one of a cyclic ($C_2$-$C_6$) ether, a ($C_1$-$C_6$)alcohol, or a hydroxyl-substituted cyclic ($C_3$-$C_7$)ether) and in the absence of activator. Constituent (A) is made by a process that consists essentially of solidifying magnesium chloride in the presence of the titanium compound and, optionally, at least one of a cyclic ($C_2$-$C_6$) ether, a ($C_1$-$C_6$)alcohol, or a hydroxyl-substituted cyclic ($C_3$-$C_7$)ether, but in the absence of the (B) azaheterocycle and any other electron donor compound and activator. The solidifying of the magnesium chloride makes the magnesium chloride solids consisting essentially of $MgCl_2$ and, optionally, at least one of a cyclic ($C_2$-$C_6$)ether, a ($C_1$-$C_6$) alcohol, or a hydroxyl-substituted cyclic ($C_3$-$C_7$)ether. The magnesium chloride solids so made are free of (B) and the any other electron donor compound and activator.

The solidifying of the magnesium chloride may comprise precipitating and/or crystallizing $MgCl_2$ from a solution of magnesium chloride and, optionally, at least one of a cyclic ($C_2$-$C_6$)ether, a ($C_1$-$C_6$)alcohol, or a hydroxyl-substituted cyclic ($C_3$-$C_7$)ether contained in a solvent. The solvent may be a hydrocarbon liquid, an excess amount of the at least one of a cyclic ($C_2$-$C_6$)ether, a ($C_1$-$C_6$)alcohol, or a hydroxyl-substituted cyclic ($C_3$-$C_7$)ether, or a combination of the hydrocarbon liquid and the excess amount. Alternatively, the solidifying may comprise evaporating the solvent from the solution; alternatively the evaporating in combination with the precipitating and/or crystallizing. The solidifying may be performed at a temperature less than 100° C.

Embodiments of the method of making the (A) pre-made solid procatalyst comprise contacting magnesium chloride ($MgCl_2$) with at least one compound of formula (III): $TiX_4$ (III), wherein each X independently is Cl, Br, I, or a ($C_1$-$C_6$)alkoxy. In some aspects each X is Cl. In some embodiments each X is a ($C_1$-$C_6$)alkoxy, alternatively a ($C_4$-$C_6$)alkoxy. Some inventive embodiments of the method of making are those wherein each X is a ($C_1$-$C_6$)alkoxy, alternatively a ($C_4$-$C_6$)alkoxy (e.g., butoxy) and the (A) pre-made solid procatalyst has a titanium-to magnesium molar ratio (Ti/Mg (mol/mol)) and is free of at least one of a cyclic ($C_2$-$C_6$)ether, a ($C_1$-$C_6$)alcohol, or a hydroxyl-substituted cyclic ($C_3$-$C_7$)ether. Such inventive embodiments may be compared to a comparative pre-made solid procatalyst that is free of at least one of a cyclic ($C_2$-$C_6$) ether, a ($C_1$-$C_6$)alcohol, or a hydroxyl-substituted cyclic ($C_3$-$C_7$)ether and wherein the comparative pre-made solid procatalyst has the same molar ratio of Ti/Mg (mol/mol) but the comparative pre-made solid procatalyst is made by a comparative method of making comprising contacting a magnesium alkoxide (e.g., Mg(($C_1$-$C_6$)alkoxy$)_2$) with at least one compound of formula (III): $TiX_4$ (III), wherein each X independently is Cl, Br, I, alternatively Cl. A comparative catalyst system made from the comparative pre-made solid procatalyst and an activator would have significantly lower catalytic activity compared to the catalytic activity of an embodiment of the inventive catalyst system made from the (A) pre-made solid procatalyst of the inventive embodiment and the same amount of activator.

The Cyclic ($C_2$-$C_6$)ether. A compound of formula

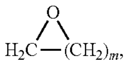

wherein subscript m is an integer from 1 to 6, alternatively from 2 to 5, alternatively from 3 to 4, alternatively 3. In some embodiments the cyclic ($C_2$-$C_6$)ether is tetrahydrofuran or tetrahydropyran, alternatively tetrahydrofuran.

The ($C_1$-$C_6$)alcohol. A compound of formula HO—($C_1$-$C_6$)alkyl, wherein the ($C_1$-$C_6$)alkyl is selected from methyl; ethyl; propyl; 1-methylethyl; butyl; 1-methylpropyl; 2-methylpropyl; 1,1-dimethylethyl; pentyl; 2-methylbutyl; 3-methylbutyl; 1-ethylpropyl; 2-ethylpropyl; 1,1-dimethylpropyl; 2,2-dimethylpropyl; hexyl; 2-methylpentyl; 3-methylpentyl; 1-ethylbutyl; 2-ethylbutyl; 1,1-dimethylbutyl; 2,2-dimethylbutyl; heptyl; 2-methylhexyl; 3-methylhexyl; 4-methylhexyl; 1-ethylpentyl; 2-ethylpentyl; 1,1-dimethylbutyl; 2,2-dimethylbutyl; and 3,3-dimethylbutyl. In some embodiments the ($C_1$-$C_6$)alcohol is methanol, ethanol, propanol, 1-methylethanol (also known as isopropanol), butanol, pentanol, or hexanol; alternatively propanol (i.e., $HOCH_2CH_2CH_3$).

The hydroxyl-substituted cyclic ($C_3$-$C_7$)ether. A compound of formula

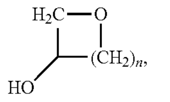

wherein subscript n is an integer from 1 to 4, alternatively from 2 to 3. In some embodiments the hydroxyl-substituted cyclic ($C_3$-$C_7$)ether is 3-hydroxytetrahydrofuran or 4-hydroxytetrahydropyran, alternatively 3-hydroxytetrahydrofuran.

The any other electron donor compound. The expression "any other electron donor compound" means an organic compound containing at least one heteroatom selected from N, O, S, P that is not the (B) azaheterocycle or the at least one of a cyclic ($C_2$-$C_6$)ether, a ($C_1$-$C_6$)alcohol, or a hydroxyl-substituted cyclic ($C_3$-$C_7$)ether.

The (B) azaheterocycle. The (B) azaheterocycle is a monocyclic, bicyclic, or tricyclic compound having at least one 3-membered to 7-membered nitrogen-heterocyclic ring whose 3 to 7 total ring atoms, respectively, consist of carbon atoms and at least one nitrogen atom. The ring atoms may consist of from 2 to 6 carbon atoms, respectively, and 1 nitrogen atom; alternatively from 1 to 5 carbon atoms, respectively, and 2 nitrogen atoms. The embodiments of the (B) azaheterocycle that are bicyclic have a second ring, which independently may be a second 3-membered to 7-membered nitrogen-heterocyclic ring or a carbocyclic ring. The embodiments of the (B) azaheterocycle that are tricyclic have a second ring and a third ring, each of which independently may be another 3-membered to 7-membered nitrogen-heterocyclic ring or a carbocyclic ring. Each 3-membered to 7-membered nitrogen-heterocyclic ring and any carbocyclic ring independently may be saturated or aromatic. The bicyclic and tricyclic rings may be fused, directly bonded, or spaced apart via a ($C_1$-$C_6$)alkylene group.

The (B) azaheterocycle may be unsubstituted or substituted with one or more substituents independently selected from a halogen atom, —OH, an unsubstituted ($C_1$-$C_{10}$)alkyl group, a halo-substituted ($C_1$-$C_{10}$)alkyl group, and a hydroxyl-substituted ($C_1$-$C_{10}$)alkyl group. In some embodiments the (B) azaheterocycle is unsubstituted; alternatively substituted with one substituent selected from a halogen atom, —OH, an unsubstituted ($C_1$-$C_{10}$)alkyl group, a halo-substituted ($C_1$-$C_{10}$)alkyl group, and a hydroxyl-substituted ($C_1$-$C_{10}$)alkyl group; alternatively substituted with two substituents independently selected from a halogen atom, —OH, an unsubstituted ($C_1$-$C_{10}$)alkyl group, a halo-substituted ($C_1$-$C_{10}$)alkyl group, and a hydroxyl-substituted ($C_1$-$C_{10}$)alkyl group. In some embodiments each substituent independently is selected from a chlorine atom, —OH, and an unsubstituted ($C_1$-$C_{10}$)alkyl group; alternatively an unsubstituted ($C_1$-$C_{10}$)alkyl group.

The (B) azaheterocycle is free of a carbon-carbon double and a carbon-carbon triple bond.

Examples of suitable (B) azaheterocycles are as described in groups (i) to (vi): (i) an azaheterocycle of formula (Ia) selected from: pyridine; 2-methylpyridine; 2-ethylpyridine; 2-(1-methylethyl)pyridine (also known as 2-isopropylpyridine); 2,4-dimethylpyridine; 2,6-dimethylpyridine (also known as 2,6-lutidine); 2-ethyl-6-methylpyridine; 2,6-diethylpyridine; 6-methyl-2-pyrindinemethanol; 2-hydroxy-6-methylpyridine; 2-fluoro-6-methylpyridine; 2-chloro-6-methylpyridine; 2,6-dichloropyridine; and 2,4,6-trimethylpyridine; (ii) an azaheterocycle of formula (Ib) selected from quinoline; 2-methylquinoline (also known as quinaldine); 2,4-dimethylquinoline; and acridine; (iii) an azaheterocycle of formula (Ic) selected from isoquinoline and 3-methylisoquinoline; (iv) an azaheterocycle of formula (Id) selected from pyrimidine; 2-methylpyrimidine; quinoxaline; and 2,3-dimethylquinoxaline; (v) an azaheterocycle of formula (Ie) selected from pyrazine; 2-methylpyrazine; 2,6-dimethylpyrazine; 2,3,5-trimethylpyrazine; 2,3,5,6-tetramethylpyrazine; and phenazine; and (vi) an azaheterocycle of formula (II) selected from piperidine; 1-methylpiperidine; 2,6-dimethylpiperidine; 3,4-dimethylpiperidine; 1,2,6-trimethylpiperidine; 2,2,6,6-tetramethylpiperidine; and 1,2,2,6,6-pentamethylpiperidine. In some embodiments the (B) azaheterocycle is of the formula (Ia) and selected from the pyridines of group (i); alternatively the (B) azaheterocycle is of the formula (Ib) and selected from the quinolines and acridine of group (ii); alternatively the (B) azaheterocycle is of the formula (Ic) and selected from the isoquinolines of group (iii); alternatively the (B) azaheterocycle is of the formula (Id) and selected from the pyrimidines and quinoxalines of group (iv); alternatively the (B) azaheterocycle is of the formula (Ie) and selected from the pyrazines and phenazine of group (v); alternatively the (B) azaheterocycle is of the formula (II) and selected from the piperidines of group (vi).

In some embodiments the (B) azaheterocycle is the aromatic azaheterocycle of formula (I):

(I)

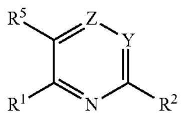

or the saturated azaheterocycle of formula (II):

(II)

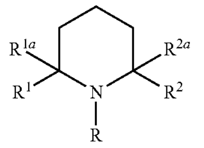

or a combination of any two or more thereof.

The method of synthesizing the procatalyst system. During the synthesis the titanium compound, magnesium chloride, and any cyclic ($C_2$-$C_6$)ether and/or a ($C_1$-$C_6$)alcohol may be mixed in the hydrocarbon solvent. An embodiment of the method may synthesize the procatalyst system in a non-polymerization reactor that is free of an olefin monomer or a polyolefin polymer, and the procatalyst system may be removed from the non-polymerization reactor and, optionally, dried (the hydrocarbon solvent removed) to give the procatalyst system in isolated form or in isolated and dried form (as a powder). Alternatively, an embodiment of the method may synthesize the procatalyst system in situ in a feed tank, and the procatalyst system then fed into a polymerization reactor without the procatalyst system being isolated or dried. Alternatively, an embodiment of the method may synthesize the procatalyst system in situ in a polymerization reactor. The in situ method in the polymerization reactor may be performed in the absence, or in the presence, of the at least one olefin monomer and/or in the presence of the polyolefin polymer. The polymerization reactor may be a gas-phase polymerization reactor, alternatively a floating-bed, gas-phase polymerization reactor. The drying may comprise spray-drying. The (B) azaheterocycle may be as defined in any one of aspects 1 to 2 or any one of the aspects (numbered or unnumbered) described earlier.

The catalyst system. The catalyst system is a new type of Ziegler-Natta catalyst. The catalyst system is made by contacting the procatalyst system with an activator. The catalyst system beneficially has increased catalytic activity and/or makes a polyolefin polymer having increased short chain branching distribution (SCBD).

The activator. Also known as a cocatalyst. The activator may be an alkylaluminum compound. Preferably the alkylaluminum compound is a $(C_1\text{-}C_6)$alkylaluminum dichloride, a di$(C_1\text{-}C_6)$alkyl-aluminum chloride, or a tri$(C_1\text{-}C_6)$ alkylaluminum. The activator may comprise a $(C_1\text{-}C_4)$alkyl-containing aluminum compound. The $(C_1\text{-}C_4)$alkyl-containing aluminium compound may independently contain 1, 2, or 3 $(C_1\text{-}C_4)$alkyl groups and 2, 1, or 0 groups each independently selected from chloride atom and $(C_1\text{-}C_4)$alkoxide. Each $C_1\text{-}C_4$)alkyl may independently be methyl; ethyl; propyl; 1-methylethyl; butyl; 1-methylpropyl; 2-methylpropyl; or 1,1-dimethylethyl. Each $(C_1\text{-}C_4)$alkoxide may independently be methoxide; ethoxide; propoxide; 1-methylethoxide; butoxide; 1-methylpropoxide; 2-methylpropoxide; or 1,1-dimethylethoxide. The $(C_1\text{-}C_4)$alkyl-containing aluminium compound may be triethylaluminum (TEA), triisobutylaluminum (TIBA), diethylaluminum chloride (DEAC), diethylaluminum ethoxide (DEAE), ethylaluminum dichloride (EADC), or a combination or mixture of any two or more thereof. The activator may be triethylaluminum (TEA), triisobutylaluminum (TIBA), diethylaluminum chloride (DEAC), diethylaluminum ethoxide (DEAE), or ethylaluminum dichloride (EADC). In some embodiments the activator is triethylaluminum (TEA).

The method of making the catalyst system. In some embodiments the procatalyst system is pre-made in situ and the method of making the catalyst system further comprises a preliminary step of pre-contacting the (A) pre-made solid procatalyst with the (B) azaheterocycle for a period of time to make the procatalyst system in situ. The length of time for the pre-contacting step may be from 0.1 to 30 minutes (e.g., about 20 minutes), or longer. In another embodiment the activating effective amount of the activator is contacted with the procatalyst system in a polymerization reactor, thereby making the catalyst system in situ in the polymerization reactor. The (B) azaheterocycle may be as defined in any one of aspects 1 to 2 or any one of the aspects (numbered or unnumbered) described earlier.

In another embodiment of the method of making the catalyst system, the activating effective amount of the activator, the (B) azaheterocycle, and the (A) pre-made solid procatalyst are contacted together simultaneously in a feed tank to make the catalyst system in situ in the feed tank, and then the catalyst system is fed into a polymerization reactor. In another embodiment the activating effective amount of the activator, the (B) azaheterocycle, and the (A) pre-made solid procatalyst are fed separately into a polymerization reactor, wherein the activator, the (B) azaheterocycle, and the (A) pre-made solid procatalyst are contacted together simultaneously to make the catalyst system in situ in the polymerization reactor. In another embodiment the activating effective amount of the activator is pre-contacted with the (B) azaheterocycle to form a premixture consisting essentially of the activator and the (B) azaheterocycle and free of the (A) pre-made solid procatalyst; and then the premixture is contacted with the (A) pre-made solid procatalyst to make the catalyst system in situ (either in a feed tank or in the polymerization reactor). The length of time for the pre-contacting step may be from 0.1 to 30 minutes (e.g., about 20 minutes), or longer.

The method of synthesizing the polyolefin polymer. The at least one olefin monomer may be as described below. In some embodiments there is one olefin monomer independently selected from ethylene, propylene, a $(C_4\text{-}C_8)$alpha-olefin, and 1,3-butadiene. In another embodiment there is a combination of any two or more olefin monomers. In the combination each olefin monomer independently may be selected from ethylene, propylene, and, optionally, 1,3-butadiene; alternatively ethylene and the $(C_4\text{-}C_8)$alpha-olefin.

Olefin monomer. Each olefin monomer independently may comprise ethylene, propylene, a $(C_4\text{-}C_{20})$alpha-olefin, or a 1,3-diene. The $(C_4\text{-}C_{20})$alpha-olefin is a compound of formula (I): $H_2C{=}C(H){-}R^*$(I), wherein R* is a straight chain $(C_2\text{-}C_{18})$alkyl group. Examples of R* are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_4\text{-}C_{20})$alpha-olefin is 1-butene, 1-hexene, or 1-octene; alternatively 1-butene or 1-hexene; alternatively 1-butene; alternatively 1-hexene; alternatively 1-octene.

Polyolefin polymer. The polyolefin polymer is a macromolecule or collection of macromolecules having repeat units derived from the at least one olefin monomer. The polyolefin polymer may have a density from 0.89 to 0.98 gram per cubic centimeter ($g/cm^3$), as measured according to ASTM D792-08 (Method B, 2-propanol). The polyolefin polymer may be a linear low-density polyethylene (LLDPE), a low-density polyethylene (LDPE), a medium-density polyethylene (MDPE), or a high-density polyethylene (HDPE). In some embodiments the polyolefin polymer is the LLDPE. The polyolefin polymer may have a unimodal polyolefin polymer having a unimodal molecular weight distribution, $M_w/M_n$; or a multimodal polyolefin polymer having a multimodal molecular weight distribution, $M_w/M_n$; wherein the $M_w/M_n$ is determined by conventional gel permeation chromatography (GPC) according to the method described later, wherein $M_w$ is weight-average molecular weight and $M_n$ is number-average molecular weight. The multimodal polyolefin polymer may be a bimodal polyethylene polymer comprising a higher molecular weight (HMW) polyethylene constituent and a lower molecular weight (LMW) polyethylene constituent, wherein the bimodal polyethylene polymer has a bimodal molecular weight distribution, $M_w/M_n$. The polyolefin polymer may be a polyethylene homopolymer, a poly(ethylene-co-propylene) copolymer, a poly(ethylene-co-propylene-1,3-butadiene) terpolymer, or a poly(ethylene-co-(C4-C20)alpha-olefin) copolymer.

Beneficial effects of inventive embodiments. The inventive embodiments described herein may beneficially yield a polyolefin polymer having at least one of benefits (a) to (f): (a) a change in comonomer distribution index (ACDI); (b) a change in short chain branching distribution (ΔSCBD), expressed as a change in short chain branching per 1000 total carbon atoms ("ΔSCB/1000TC"); (c) a change in molecular weight distribution ($\Delta(M_z/M_w)$); (d) a change in molecular weight (Mw2) of the copolymer fraction 2 without significantly changing the amount of copolymer fraction 2 (Wt2) in the polyolefin polymer; (e) a change (Δ) in melt index ($I_2$; 190° C., 2.16 kg) and melt flow ratio ($I_{21}/I_2$; 190° C., 2.16 kg); all relative to a polyolefin polymer synthesized by a comparative catalyst system that is the same except lacks the (B) azaheterocycle; and (f) a change in catalyst productivity (cat. prod.) of an in situ made embodiment of the catalyst system, relative to a pre-made embodiment of the catalyst system. Without being bound by theory, it is believed that the (B) azaheterocycle functions in the catalyst system as an external donor compound in such a way that the composition and structure of the polyolefin polymer made by the catalyst system is different than that of a comparative polyolefin polymer made by a comparative catalyst system that lacks the (B) azaheterocycle as an external electron donor compound.

The beneficial effects of the inventive embodiments are demonstrated by the working examples and test data described later in the respective EXAMPLES section and associated Figures that accompany this specification. The beneficial effects (a) to (f) based on the working examples and test data are discussed below.

The (a) ΔCDI achieved by the inventive embodiments may be a decrease in CDI or an increase in CDI. The decrease in CDI may be described as a negative ΔCDI=from −20% to −5%. The increase in CDI may be described as a positive ΔCDI=from 10% to 70%, alternatively from 20% to 70%; alternatively from 30% to 70%; alternatively from 40% to 70%; alternatively from 50% to 70%. The increase in CDI may also be referred to as an improved uniformity of comonomer content distribution. The direction and extent of ΔCDI may be controlled by choice of catalyst, choice of external electron donor compound, molar ratio of external electron donor compound to catalyst, and/or method of combining the catalyst with the external electron donor compound. A polyolefin polymer having an increased CDI (positive ΔCDI) beneficially has improved mechanical properties.

The (b) ΔSCB/1000TC achieved by the inventive embodiments may be described as an increase in SCB/1000TC or a decrease in SCB/1000TC. The increase in SCB/1000TC may be described as a positive ΔSCB/1000TC=from ≥0 to 70%, alternatively from 20% to 70%; alternatively from 30% to 70%; alternatively from 40% to 70%; alternatively from 50% to 70%. The direction and extent of ΔSCB/1000TC may be controlled by choice of catalyst, choice of polymerization conditions, choice of external electron donor compound, molar ratio of external electron donor compound to catalyst, and/or method of combining the catalyst with the external electron donor compound. A polyolefin polymer having an increased SCB/1000TC (positive ΔSCB/1000TC) may beneficially have improved resistance to slow crack growth (SCG https://pubs.acs.org/doi/pdf/10.1021/ma070454h).

The (c) $\Delta(M_z/M_w)$ achieved by the inventive embodiments may be described as an increase in $M_z/M_w$ or a decrease in $M_z/M_w$. The decrease in $M_z/M_w$ may be described as a negative $\Delta(M_z/M_w)$=from <0 to <−10%. The direction and extent of $\Delta(M_z/M_w)$ may be controlled by choice of catalyst, choice of external electron donor compound, molar ratio of external electron donor compound to catalyst, and/or method of combining the catalyst with the external electron donor compound. A polyolefin polymer having a decreased $M_z/M_w$ (negative $\Delta(M_z/M_w)$) beneficially has improved abuse-resistant properties and/or improved optical properties, when tested as a film. The improved abuse-resistant properties comprise increased resistance to dart impact and/or increased resistance to puncture. The improved optical properties comprise decreased haze and/or increased clarity.

The (d) change in molecular weight (Mw2) of the copolymer fraction 2 without significantly changing the amount of copolymer fraction 2 (Wt2) in the polyolefin polymer achieved by the inventive embodiments may be described as an increase in molecular weight (Mw2) of the copolymer fraction (Wt2) in the polyolefin polymer (Mw2/Mw2(0) >1.20) without significantly decreasing the amount of copolymer fraction (Wt2/Wt2(0)≥0.98). The direction and extent of benefit (d) may be controlled by controlling the molar ratio of moles of external electron donor compound to moles of the active metal Ti (EEDC/Ti (mol/mol)) in the procatalyst system. A polyolefin polymer having Mw2/Mw2(0) >1.20 while maintaining Wt2/Wt2(0)≥0.98 beneficially independently has improved abuse-resistance properties as described above.

The (e) $\Delta I_2$ and $\Delta I_{21}/I_2$ achieved by the inventive embodiments may be described as a decrease in $I_2$ and/or a decrease in $I_{21}/I_2$. The decrease in $I_2$ and/or a decrease in $I_{21}/I_2$ may be described as a negative $\Delta I_2$ and/or a negative $\Delta I_{21}/I_2$=from <0 to <−10%. The direction and extent of $\Delta I_2$ and/or $\Delta I_{21}/I_2$ may be controlled by choice of catalyst, choice of external electron donor compound, molar ratio of external electron donor compound to catalyst, and/or method of combining the catalyst with the external electron donor compound. A polyolefin polymer having a decreased $I_2$ and/or a decreased $\Delta I_{21}/I_2$ (negative $\Delta I_2$ and/or a negative $\Delta I_{21}/I_2$) beneficially has improved abuse-resistance properties and improved optical properties as described above.

The direction and extent of benefits (a) to (e) may be adjusted by selecting a different (B) azaheterocycle in the inventive embodiments, as different embodiments of the (B) azaheterocycle will have different amounts and types of external electron donor effects on benefits (a) to (e). Without being bound by theory, it is believed that the stronger the electron donating effect is of the (B) azaheterocycle, the greater the extent is the external electron donor effect thereof. For example as shown by the (B) azaheterocycle compounds used in the working examples later (called an External Electron Donor Compound-# or EEDC-# such as EEDC1 to EEDC-16 and EEDC-20 to EEDC-25), similar to the 2,6-dimethylpyridine, the (B) azaheterocycle compounds with hydrocarbyl or halogen substitution at 2-position or both 2- and 6-positions (EEDC-2 to EEDC-10 in IE9-IE17) increase CDI while not causing significant reduction in comonomer content (Wt2/Wt2(0)) and copolymer molecular weight (Mw2/Mw2(0)). In contrast, substituted piperidines (EEDC-11 and EEDC-12) provide significant decreases in Δ(SCB/1000TC). When the nitrogen atom of the azaheterocycle of formula (II) is also substituted (EEDC-13), the (B) azaheterocycle is a weak electron donor that barely results in changes to properties of the polyolefin polymer. Minimal effects on polyolefin polymer properties, especially on CDI, are achieved when the substitution on the pyridine ring of the azaheterocycle of formula (1) is not on the 2- or 6-position (EEDC-14), or the substitution on the 2- or 6-position is not a primary alkyl group (EEDC-15), or one of the substituents on the 2- or 6-position is not hydrocarbyl or halogen (EEDC-16).

The direction and extent of benefits (a) to (e) may also be adjusted by selecting an embodiment of the (B) azaheterocycle that has two nitrogen atoms per molecule (e.g., an azaheterocycle of formula (Id) or (Ie) instead of one nitrogen atom per molecule (e.g., an azaheterocycle of formula (Ia), (Ib), or (Ic). Without being bound by theory, it is believed that the stronger the electron donating effect is of the (B) azaheterocycle, the greater the extent is the external electron donor effect thereof.

The (f) change in catalyst productivity (cat. prod.) of an in situ made embodiment of the catalyst system, relative to a pre-made embodiment of the catalyst system may be a decrease in catalyst productivity or an increase in catalyst productivity. The change in catalyst productivity achieved by one or more of aspects (a) to (d): (a) avoiding contacting the procatalyst system with the activator outside of the gas-phase polymerization reactor, but instead separately feeding the activator and the procatalyst system into reactor so as to make in the reactor the in situ embodiment of the catalyst system; (b) making the (A) pre-made solid procatalyst from a titanium compound that is a titanium alkoxide instead of a titanium halide, or vice versa; (c) altering the molar ratio of moles of (B) azaheterocycle to moles of Ti metal ((B)/Ti (mol/mol)) in the procatalyst system used to make the catalyst system; and (d) adding the ligand-metal complex of formula (IV) (e.g., wherein M is Hf) to the procatalyst system, and hence providing a single-site metallocene catalyst in the catalyst system. A catalyst system having a decreased productivity beneficially has a lesser sensitivity to increases in temperature in the polymerization reactor, such as temperature increases resulting from a too-fast fresh catalyst light-off. A catalyst system having an increased productivity beneficially has improved (increased) amount of polyolefin polymer made per unit weight of catalyst system or per mole of Ti metal.

General definitions. General definitions of a procatalyst composition of the Ziegler-Natta type, electron donor compound, external electron donor compound, internal electron donor compound, film, and polyethylene polymer follow.

Procatalyst composition (Ziegler-Natta-type). Generally a catalytic metal (e.g., a Group 4 element such as Ti, Zr, or Hf) supported on a 3-dimensional structure composed of a magnesium halide. Generally, the process of making the procatalyst composition uses a reaction mixture comprising a solvent and reactants comprising a magnesium halide and a titanium compound. The making comprises halogenating the titanium metal and titanating the magnesium halide in solution, and then solidifying the procatalyst composition.

Electron donor compound (EDC). Generally, an organic molecule containing carbon atoms, hydrogen atoms, and at least one heteroatom that has a free pair of electrons capable of coordinating to a metal atom in need thereof (e.g., a metal cation). The heteroatom may be selected from N, O, S, or P. Depending upon when or to which reactants the electron donor compound is added in a process of making a procatalyst composition, the electron donor compound may end up functioning in the procatalyst composition as an internal electron donor compound (I EDC) if added earlier or as an external electron donor compound (EEDC) if added later as described herein. Generally the terms "internal" and "external" indicate where the electron donor compound is located and what type of effect it has in the procatalyst composition containing same, which in turn are direct results of when or to which reactants the electron donor compound is added in a process of making a procatalyst composition.

External electron donor compound (EEDC). Also known as an external electron donor or external donor. The term "external" indicates that the electron donor compound is positioned, and has its main effect, on the outside or exterior of the 3-dimensional structure composed of magnesium halide in the procatalyst composition. These external features are accomplished by virtue of adding the electron donor compound to the procatalyst composition after the 3-dimensional structure composed of magnesium halide has been formed in the procatalyst composition. The resulting post-solidification presence of the electron donor compound enables it to donate at least one of its pair of electrons to one or more of Ti or Mg metals mostly on the exterior of the 3-dimensional structure composed of magnesium halide. Thus, without being bound by theory, it is believed that the electron donor compound, when employed as the external electron donor compound, affects the following properties of the polyolefin polymer made from the catalyst system made from the procatalyst composition, the properties comprising: level of tacticity (i.e., xylene soluble material), molecular weight and properties that are a function of at least molecular weight (e.g., melt flow), molecular weight distribution (MWD), melting point, and/or oligomer level.

Internal electron donor compound (IEDC). Also known as an internal electron donor or internal donor. The term "internal" indicates that the electron donor compound is positioned, and has its main effect, on the inside or in the interior of the 3-dimensional structure composed of magnesium halide in the procatalyst composition. These internal features are accomplished by virtue of adding the electron donor compound, or otherwise forming it in the presence of, the magnesium halide and titanium compound reactants during the making of the procatalyst composition. The resulting in situ presence of the electron donor compound enables it to donate at least one of its pair of electrons to one or more of Ti or Mg metals inside the 3-dimensional structure composed of magnesium halide in the procatalyst composition. The electron donor compound could not reach the inside or interior of the 3-dimensional structure composed of magnesium halide in the procatalyst composition if it instead had been added after the 3-dimensional structure composed of magnesium halide was formed. Thus, without being bound by theory, it is believed that the electron donor compound, when employed as the internal electron donor compound, is available to (1) regulate the formation of active sites in the (A) procatalyst composition, (2) regulate the position of titanium on the magnesium-based support in the procatalyst composition, thereby enhancing stereoselectivity of the procatalyst composition and ultimately enhancing the stereoselectivity of the catalyst system made therefrom, (3) facilitate conversion of the magnesium salt and titanium compound into their respective halide compounds, and (4) regulate the size of the magnesium halide solid (e.g., crystallite size) during conversion and solidification (e.g., crystallization) thereof. Thus, provision of the internal electron donor yields a procatalyst composition with enhanced stereoselectivity.

As used herein, the (B) azaheterocycle is an EEDC, but not an IEDC.

Film. A manufactured article that is restricted in one dimension.

Low density. As applied to a polyethylene herein, having a density of from 0.910 to 0.929 $g/cm^3$, measured according to ASTM D792-08 (Method B, 2-propanol).

Medium density. As applied to a polyethylene herein, having a density of from 0.930 to 0.940 $g/cm^3$, measured according to ASTM D792-08 (Method B, 2-propanol).

High density. As applied to a polyethylene herein, having a density of from 0.941 to 0.970 g/cm$^3$, measured according to ASTM D792-08 (Method B, 2-propanol).

Homopolymer. A polymer derived from one species of monomer. As IUPAC teaches, the species may be real (e.g., ethylene or a 1-alkene), implicit (e.g., as in poly(ethylene terephthalate)), or hypothetical (e.g., as in poly(vinyl alcohol)).

The relative terms "higher" and "lower" in the HMW polyethylene constituent and the LMW polyethylene constituent, respectively, are used in reference to each other and merely mean that the weight-average molecular weight of the HMW polyethylene constituent ($M_{w-HMW}$) is greater than the weight-average molecular weight of the LMW polyethylene constituent ($M_{w-LMW}$), i.e., $M_{w-HMW}>M_{w-LMW}$.

Any compound, composition, formulation, mixture, or product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, TI, Pb, Bi, lanthanoids, and actinoids; with the proviso that any required chemical elements (e.g., C and H required by a polyolefin; or C, H, and O required by an alcohol) are not excluded.

Alternatively precedes a distinct embodiment. Aspect means an embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. ISO is International Organization for Standardization, Chemin de Blandonnet 8, CP 401-1214 Vernier, Geneva, Switzerland. Terms used herein have their IUPAC meanings unless defined otherwise. For example, see IUPAC's *Compendium of Chemical Terminology*. Gold Book, version 2.3.3, Feb. 24, 2014. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. In mathematical equations, "*" indicates multiplication and "1" indicates division.

For property measurements, samples are prepared into test specimens, plaques, or sheets according to ASTM D4703-10, *Standard Practice for Compression Molding Thermoplastic Materials into Test Specimens, Plaques, or Sheets.*

Density is measured according to ASTM D792-08, *Standard Test Methods for Density and Specific Gravity* (*Relative Density*) *of Plastics by Displacement*, Method B (for testing solid plastics in liquids other than water, e.g., in liquid 2-propanol). Report results in units of grams per cubic centimeter (g/cm$^3$; also written as g/cc).

Gel Permeation Chromatography (Gpc) Test Method (Conventional Gpc):

Instrumentation and eluent. The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used. The autosampler oven compartment was set at 160° C. and the column compartment at 150° C. The columns used were three Agilent "Mixed B" 30-centimeters (cm) 20-micrometers (μm) linear mixed-bed columns. Used nitrogen sparged chromatographic solvent "TCB" having 1,2,4 trichlorobenzene that contained 200 ppm of butylated hydroxytoluene (BHT). The injection volume used was 200 microliters (μL) and the flow rate was 1.0 milliliters/minute (mL/min.).

Calibration. Calibrate the GPC column set with at least 20 narrow molecular weight distribution polystyrene standards from Agilent Technologies with molecular weights ranging from 580 to 8,400,000 grams per mole (g/mol). These were arranged in 6 "cocktail" mixtures with at least a "decade" of separation between individual molecular weights. The polystyrene standards were prepared at a concentration of 0.025 grams (g) polystyrene in 50 mL of solvent for molecular weights equal to or greater than 1,000,000, and 0.05 g polystyrene in 50 mL of solvent for molecular weights less than 1,000,000. The polystyrene standards were dissolved in the solvent at 80° C. with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)): $M_{polyethylene}=A*(M_{polystyrene})^B$ (EQ. 1), wherein $M_{polyethylene}$ is the molecular weight of polyethylene, $M_{polystyrene}$ is the molecular weight of polystyrene, A has a value of 0.4315, and B is equal to 1.0. A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at Mw 52,000 g/mol.

Total Plate Count and Symmetry. The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection. Plate Count$=5.54*[(RV_{Peak\ Max})/\text{Peak Width at half height})]^2$ (EQ. 2), wherein $RV_{Peak\ Max}$ is the retention volume in milliliters at the maximum height of the peak, the peak width is in milliliters, half height is one-half (½) height of the peak maximum. Symmetry$=(\text{Rear Peak } RV_{one\ tenth\ height}-RV_{Peak\ Max})/(RV_{Peak\ Max}-\text{Front Peak } RV_{one\ tenth\ height}))$ (EQ. 3), wherein Rear Peak $RV_{one\ tenth\ height}$ is the retention volume in milliliters at one tenth peak height of the peak tail, which is the portion of the peak that elutes later than the Peak Max, $RV_{Peak\ Max}$ is as defined for EQ. 2, and Front Peak $RV_{one\ tenth\ height}$ is the retention volume in milliliters at one tenth peak height of the peak front, which is the portion of the peak that elutes earlier than the Peak Max. The chromatographic system's plate count value from EQ. 2 should be greater than 24,000 and its symmetry should be between 0.98 and 1.22.

Test Sample Preparation. Samples of polyolefin polymer for GPC testing were prepared in a semi-automatic manner with the PolymerChar "Instrument Control" Software, wherein concentrations of the samples were weight-targeted at 2 milligrams per milliliter (mg/mL), and the TCB solvent was added to a pre nitrogen-sparged septa-capped vial, via the PolymerChar high temperature autosampler. The samples were dissolved for 2 hours at 160° C. under "low speed" shaking.

Molecular Weights Calculations. The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from EQ. 1.

$$Mn_{(GPC)} = \frac{\sum^{i} IR_i}{\sum^{i} \left(IR_i / M_{polyethylene_i}\right)} \quad \text{(EQ 4)}$$

$$Mw_{(GPC)} = \frac{\sum^{i} \left(IR_i * M_{polyethylene_i}\right)}{\sum^{i} IR_i} \quad \text{(EQ 5)}$$

$$Mz_{(GPC)} = \frac{\sum^{i} \left(IR_i * M^2_{polyethylene_i}\right)}{\sum^{i} \left(IR_i * M_{polyethylene_i}\right)} \quad \text{(EQ 6)}$$

$M_w/M_n$ represents the breadth of molecular weight distribution of a polymer. Mz/Mw is used as an indicator for presence of high molecular polymer chain. The percentage difference between the Mz/Mw of a polymer obtained from using an external donor (Mz(1)/Mw(1)) and that without using an external donor (Mz(0)/Mw(0)) under the same polymerization condition, Δ(Mz/Mw)%, is calculated to reflect the change in high molecular weight content in the polymer in the presence of the external donor. Δ(Mz/Mw)%=(Mz(1)/Mw(1)−Mz(0)/Mw(0))/Mz(0)/Mw(0)*100 (EQ 7).

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 8. Processing of the flow marker peak was done via the PolymerChar GPCOne™ Software. Acceptable flowrate correction is such that the effective flowrate should be within +/−2% of the nominal flowrate. Flowrate(effective)=Flowrate(nominal)*(RV(FM Calibrated)/RV(FM Sample)) (EQ 8).

Hexane Extractables Content Test Method: Measured according to a procedure that follows both the Food and Drug Administration (FDA) procedure for determining the hexane extractable portion of Homopolymer and Copolymer Polyethylene and Copolymer Polypropylene (Title 21 Code of Federal Regulations (C.F.R.) § 177.1520 (d)(3)(ii) Paragraphs e-i) (option 2) 4-1-2001 edition and ASTM D5227-13, *Standard Test Method for Measurement of Hexane Extractable Content of Polyolefins.*

High Load Melt Index (Flow Index) Test Method ("HLMI" or "FI" or "$I_{21}$"): use ASTM D1238-10, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Index Test Method ("$I_2$"): for ethylene-based (co) polymer is measured according to ASTM D1238-13, using conditions of 190° C./2.16 kg.

Melt Index Test Method ("$I_5$"): for ethylene-based (co) polymer is measured according to ASTM D1238-13, using conditions of 190° C./5.0 kg.

Melt Flow Ratio MFRS: ("$I_{21}/I_5$") Test Method: calculated by dividing the value from the HLMI $I_{21}$ Test Method by the value from the Melt Index $I_5$ Test Method. Short Chain Branches Per 1000 Total Carbon Atoms (SCB/1000TC) Measurement Test Method:

Calibration: calibrate an IR5 detector rationing using at least ten ethylene-based polymer standards (polyethylene homopolymer and ethylene/octene copolymers) of known short chain branching (SCB) frequency (as measured by the $^{13}C$ nuclear magnetic resonance (NMR) spectroscopy). The SCB/1000TC of the standards range from 0 SCB/1000TC (polyethylene homopolymer) to approximately 50 SCB/1000TC (ethylene/octene copolymer). The total number of carbon atoms equals the sum of total carbon atoms in the ethylene-based polymer's backbone plus the total carbon atoms in its short chain branches. Each standard has a weight-average molecular weight ($M_w$) from 36,000 to 126,000 grams/mole (g/mol), as determined by the GPC.LALS processing method described above. Each standard has a conventional molecular weight distribution ($M_w/M_n$) from 2.0 to 2.5, as determined by the GPC-LALS processing method described above. Properties of the SCB standards are shown in Table A.

TABLE A

Short-chain branching ("SCB") Measurement Standards:

| Wt % Comonomer | IR5 Area ratio | SCB/1000 Total Carbon atoms | $M_w$ (g/mol) | $M_w/M_n$ |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

Calculations: calibrate for the IR5 detector rationing using polymer standards of known short chain branching (SCB) frequency (as measured by 13C NMR Method). The "IR5 Area Ratio (or "$IR5_{Methyl\ Channel\ Area}/IR5_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 9: SCB/1000 total $C=A_0+[A_1\times(IR5_{Methyl\ Channel\ Area}/IR5_{Measurement\ Channel}\ Area)]$(EQ 9), wherein $A_0$ is the "SCB/1000TC" intercept at an "IR5 Area Ratio" of zero, and $A_1$ is the slope of the "SCB/1000TC" versus "IR5 Area Ratio" and represents the increase in the SCB/1000TC as a function of "IR5 Area Ratio." The percentage difference between the "SCB/1000TC" of a polymer obtained from using an external electron donor compound ("SCB(1)/1000TC") and that obtained without using an EEDC ("SCB(0)/1000TC") under the same polymerization conditions, Δ(SCB/1000TC)%, is calculated to reflect the change in SCB in the polyolefin polymer in the presence of the EEDC. Δ(SCB/1000TC)%=("SCB(1)/1000TC" −"SCB(0)/1000TC")/"SCB(0)/1000TC"*100 (EQ 10).

"A series of linear baseline-subtracted chromatographic heights" for the chromatogram generated by the "IR5 methyl channel sensor" was established as a function of column elution volume, to generate a baseline-corrected chromatogram (methyl channel). "A series of linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer as follows in Equation 11: Mole Percent Comonomer={$SCB_f$/[$SCB_f$+((1000−$SCB_f$*Length of comonomer)/2)]}*100 (EQ 11), wherein "$SCB_f$" is the "SCB per 1000 total C", and the "Length of comonomer"=8 for 1-octene, 6 for 1-hexene, 4 for 1-butene, etc.

Comonomer Distribution Index (CDI):

Each elution volume index was converted to a molecular weight value ($Mw_i$) using the method of Williams and Ward (described above; Eqn. 1B). The "Mole Percent Comonomer (y axis)" was plotted as a function of Log($Mw_i$), and the slope was calculated for the central portion of the GPC peak area excluding 15% of lowest Mw (left side portion) and 15% of the highest Mw (right side portion) (end group corrections on chain ends were omitted for this calculation). (An EXCEL linear regression was used to calculate the slope between, and including, 15% and 85% of the GPC peak). This slope is defined as the comonomer distribution index (CDI).

The percentage difference between the CDI of a polymer obtained from using an external donor (CDI(1)) and that without using an external donor (CDI(0)) under the same polymerization condition, Δ(CDI)%, is calculated to reflect the change in CDI in the polymer in the presence of the external donor. Δ(CDI)%=(CDI(1)−CDI(0))/CDI(0)*100 (EQ 12).

Improved Comonomer Content Distribution (iCCD) Test Method:

Improved comonomer content distribution (iCCD) analysis was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length) by ¼" (ID) (0.635 cm ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with $N_2$ purging capability. ODCB is sparged with dried nitrogen ($N_2$) for one hour before use. Sample preparation was done with autosampler at 4 mg/mL (unless otherwise specified) under shaking at 160° C. for 1 hour. The injection volume was 300 μL. The temperature profile of iCCD was: crystallization at 3° C./min from 105° to 30° C., the thermal equilibrium at 30° C. for 2 minutes (including Soluble Fraction Elution Time being set as 2 minutes), elution at 3° C./minute from 30° to 140° C. The flow rate during crystallization is 0.0 milliliter per minute (mL/min). The flow rate during elution is 0.50 mL/min. The data were collected at one data point/second. The iCCD column was packed with gold coated nickel particles (Bright 7GNM8-NiS, Nippon Chemical Industrial Co.) in a 15 cm (length) by 0.635 cm (¼") (ID) stainless tubing. The column packing and conditioning were with a slurry method according to the reference (Cong, R.; Parrott, A.; Hollis, C.; Cheatham, M. WO2017/040127A1). The final pressure with TCB slurry packing was 15 megapascals (Mpa; 150 bars).

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/mL) and Eicosane (2 mg/mL) in ODCB. The iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL.

The modeling of the reported elution peak temperatures as a function of octene mole % using linear regression resulting in the model of Equation 13 (EQ 13) for which statistical coefficient of determination, $r^2$, was 0.978. (Elution Temperature)=−6.3515(1-octene mole percent)+101.000 (EQ. 13).

For the whole resin, integration windows are set to integrate all the chromatograms in the elution temperature (temperature calibration is specified above) range from 23.0° to 115° C. The eluted components from the CCD analysis of an ethylene/alpha-olefin copolymer resin comprise a high density fraction (HDF or Wt3), a copolymer fraction (Wt2), and a purge fraction (PF or Wt1).

The weight percentage of the high density polyolefin fraction of the resin (HDF, or Wt3) is defined by the following Equation 14 (EQ 14): HDF or Wt3=100%*(integrated area of elution window 94.5° to 115° C.)/(integrated area of entire elution window 23° to 115° C.) (EQ. 14).

The weight percentage of copolymer fraction of the resin (Wt2) is defined by Equation 15 (EQ. 15): Wt2=100%*(integrated area of elution window 35° to 94.5° C.)/(integrated area of entire elution window 23° to 115° C.) (EQ. 15).

The weight percentage of purge fraction of the resin (PF or Wt1) is defined by Equation 16 (EQ. 16): Wt1=100%*(integrated area of elution window 23° to 35° C.)/(integrated area of entire elution window 23° to 115° C.) (EQ. 16).

A plot of iCCD has a peak temperature Tp3 for high density fraction Wt3, a peak temperature Tp2 for the copolymer fraction Wt2, and a peak temperature Tp1 for the purge fraction Wt1. The high density fraction or Wt3 has a weight-average molecular weight Mw3, the copolymer fraction Wt2 has a weight-average molecular weight Mw2, and the purge fraction Wt1 has a weight-average molecular weight Mw1.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Baselines were subtracted from LS, and concentration detector chromatograms. Integration windows are set to integrate all the chromatograms in the elution temperature (temperature calibration is specified above) range from 23.0° to 120° C.

The weight-average molecular weights Mw3, Mw2, and Mw1 are calculated from iCCD using the following steps (1) to (4). (1): Measure interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0 g/10 min., MWD ($M_w/M_n$) approximately 2.6 by conventional gel permeation chromatography) is used. Same experimental conditions as the normal iCCD method above are used except the following parameters: crystallization at 10° C./min from 140° to 137° C., the thermal equilibrium at 137° C. for 1 minute as Soluble Fraction Elution Time, soluble fraction (SF) time of 7 minutes, elution at 3° C./min from 137° to 142° C. The flow rate during crystallization is 0.0 mL/min. The flow rate during elution is 0.80 mL/min. Sample concentration is 1.0 mg/mL. (2): Each LS data point in LS chromatogram is shifted to correct for the interdetector offset before integration. (3): Baseline subtracted LS and concentration chromatograms are integrated for the whole eluting temperature range of the Step (1). The MW detector constant is calculated by using a known MW HDPE sample in the range of 100,000 to 140,000Mw and the area ratio of the LS and concentration integrated signals. (4): Mw of the polymer was calculated by using the ratio of integrated light scattering detector (90 degree angle) to the concentration detector and using the MW detector constant.

EXAMPLES

Synthesis of (A) pre-made solid procatalyst examples PCAT-1 to PCAT-7.

PCAT-1: A spray-dried procatalyst prepared according to the method in US998847562, column 7, line 64, to column 8, line 47, to give PCAT-1. PCAT-1 contains 2.3 wt % of Ti and 26.8 wt % of tetrahydrofuran (THF) as internal electron donor compound.

PCAT-2: 5.2 mL of 0.20 M 2,6-dimethylpyridine (ED-1) solution is added dropwise into 40 mL of 0.0052 M Ti PCAT-1 slurry in mineral oil with stirring at room temperature. Allow the reaction to continue after completion of the addition for one hour to give PCAT-2. The molar ratio of ED-1 to Ti in PCAT-2 is 5/1.

PCAT-3: 26.1 mL of 0.20 M 2,6-dimethylpyridine (ED-1) is added dropwise into 40 ml of 0.0052 M Ti PCAT-1 slurry in mineral oil with stirring at room temperature. Allow the reaction to continue after completion of the addition for one hour to give PCAT-3. The molar ratio of ED-1 to Ti in PCAT-3 is 25/1.

PCAT-4: PCAT-4 is prepared according to inventive example IE2a in WO 2019/241044 A1 to give PCAT-4. PCAT-4 contains Ti and THF as internal electron donor.

PCAT-5: PCAT-5 is prepared according to the method described under the heading Catalyst Precursor Production in paragraphs [0168] to [0173] of US 2013/0137827 A1. PCAT-5 contains Ti and Hf, but does not contain internal electron donor.

PCAT-6: 280 mL of 0.10 M butylethylmagnesium solution (made from 0.90 M butylethylmagnesium in heptane diluted by Isopar E, wherein butylethylmagnesium is of formula $CH_3(CH_2)_3MgCH_2CH_3$) and 22.7 mL of 0.62 M triisobutylaluminum (made from 1.0 M triisobutylaluminum in heptane diluted by Isopar E) are charged into a 1-L jacketed glass reactor equipped with a Teflon impeller and temperature control by a silicon oil bath with the capacity for cooling (0° to 22° C.). Agitation at 200 rpm is maintained throughout the procatalyst preparation. 7.31 mL of n-propanol is dropwise added to the mixture. The addition rate is controlled to maintain the temperature of the reaction mixture below 35° C. with the aid of the oil bath. 1.67 mL of 1.68 M titanium(IV) tetraisopropoxide solution in Isopar E is added dropwise to the mixture via syringe at 30° C. 72 mL of 0.77 M ethylaluminum dichloride (made from 1.0 M ethylaluminum dichloride in heptane diluted by Isopar E) is added via a syringe pump at the rate of 2.733 mL/min at 30° C. Then 108 mL of the 0.77 M ethylaluminum dichloride solution is added at 5.465 mL/min at 40° C. The resulting mixture is aged at 80° C. for 4 hours to give PCAT-6. PCAT-6 is used in polymerization test as a slurry (0.0057 M Ti in the slurry). PCAT-6 does not contain any internal electron donor.

PCAT-7: A slurry of PCAT-1 in mineral oil is charged to an agitated vessel. Tri-n-hexylaluminum (TnHAl) is added to the vessel at the molar ratio of 0.25 mol TnHAl/100 mol THF, and allowed to mix for one hour. Afterward, diethylaluminum chloride (DEAC) is added to the mixture at the molar ratio of 0.5 mol DEAC/1.0 mol THF, and allowed to mix for at least one hour to give PCAT-7.

Selection of (B) azaheterocycle examples 1 to 16 and 20 to 25 are referred to herein as External Electron Donor Compounds 1 to 16 and 20 to 25 (EEDC-1 to EEDC-16 and EEDC-20 to EEDC-25). These are listed in Table B.

Comparative External Electron Donor Compounds 17 to 19 are referred to herein as EEDC-17 to EEDC-19. These are also listed in Table B.

All EEDC-1 to EEDC-25 are used in the working examples as 0.20 molar (M) solutions thereof in alkanes solvent (Isopar E).

TABLE B

| Listing of External Electron Donor Compounds (EEDCs). | | |
|---|---|---|
| EEDC | Compound Name | Type |
| EEDC-1 | 2,6-Dimethylpyridine | (B) azaheterocycle |
| EEDC-2 | 2,4-Dimethylpyridine | (B) azaheterocycle |
| EEDC-3 | 2-Ethyl-6-methylpyridine | (B) azaheterocycle |
| EEDC-4 | 2,6-Diethylpyridine | (B) azaheterocycle |
| EEDC-5 | 2-Ethylpyridine | (B) azaheterocycle |
| EEDC-6 | 2-Fluoro-6-methylpyridine | (B) azaheterocycle |
| EEDC-7 | 2-Chloro-6-methylpyridine | (B) azaheterocycle |
| EEDC-8 | 6-Methyl-2-pyridinemethanol | (B) azaheterocycle |
| EEDC-9 | Quinaldine | (B) azaheterocycle |
| EEDC-10 | 3-Methylisoquinoline | (B) azaheterocycle |
| EEDC-11 | cis-2,6-Dimethylpiperidine | (B) azaheterocycle |
| EEDC-12 | 2,2,6,6-Tetramethylpiperidine | (B) azaheterocycle |
| EEDC-13 | 3,4-Dimethypyridine | (B) azaheterocycle |
| EEDC-14 | 1,2,2,6,6-Pentamethylpiperidine | (B) azaheterocycle |
| EEDC-15 | 2-Isopropylpyridine | (B) azaheterocycle |
| EEDC-16 | 2-Hydroxy-6-methylpyridine | (B) azaheterocycle |
| EEDC-17 | Tetraethoxysilane | Comparative |
| EEDC-18 | 4,4-Bis(methoxymethyl)-2, 6-dimethylheptane | Comparative |
| EEDC-19 | Dicyclopentyldimethoxysilane | Comparative |
| EEDC-20 | Pyrazine | (B) azaheterocycle |
| EEDC-21 | 2,6-Dimethylpyrazine | (B) azaheterocycle |
| EEDC-22 | 2-n-Propylpyridine | (B) azaheterocycle |
| EEDC-23 | 2,4,6-Trimethylpyridine | (B) azaheterocycle |
| EEDC-24 | 2,6-Dichloropyridine | (B) azaheterocycle |
| EEDC-25 | 2-Methylpyridine | (B) azaheterocycle |

Examples of inventive and comparative procatalyst systems, and examples of inventive and comparative catalyst systems made therefrom, may be made by using different steps or different orders of steps. Examples of these different modes of making include modes M-1 to M-4 described below. Modes M-1 to M-4 vary addition of system components (constituents or reactants) triethylaluminum (TEA), one of (B) examples EEDC-1 to EEDC-25 (if used), and one of (A) pre-made solid procatalyst examples PCAT-1 to PCAT-7.

Addition Mode M-1: TEA, one of EEDC-1 to EEDC-25 (if used), and one of PCAT-1 to PCAT-7 contacting with each other for about 20 minutes before the resulting mixture is injected into a polymerization reactor.

Addition Mode M-2: TEA, one of EEDC-1 to EEDC-25 (if used), and one of PCAT-1 to PCAT-7 are added separately into a polymerization reactor in sequence. That is, first add TEA, next add one of EEDC-1 to EEDC-25 (if used), then add one of PCAT-1 to PCAT-7.

Addition Mode M-3: contact TEA and one of EEDC-1 to EEDC-25 with each other for about 20 minutes, and add the pre-mixture into a polymerization reactor, and then add one of PCAT-1 to PCAT-7 into the reactor.

Addition Mode M-4: first TEA added into a polymerization reactor, followed by addition of a procatalyst system that has been pre-made by contacting one of EEDC-1 to EEDC-25 with one of PCAT-1 to PCAT-7 for about 20 minutes.

For comparative examples, wherein no EEDC is used, addition modes M-2, M-3, and M-4 are effectively the same.

Continuous fluidized-bed gas-phase polymerization procedure. Procatalyst (PCAT-1 or PCAT-4 or PCAT-7) is injected as a slurry into a fluidized-bed gas-phase polymerization reactor. Triethylaluminum (TEA) cocatalyst is fed to the fluid bed reactor as a 2.5 wt % solution in isopentane. When an EEDC is used, it is fed to the fluid bed reactor as a solution in isopentane. The polymerization is conducted in a fluidized bed 33.7 centimeter (cm; 13.25 inches) internal diameter (ID) gas-phase reactor. Ethylene, hydrogen, 1-hexene and nitrogen are continuously fed to the cycle gas loop just upstream of a compressor at quantities sufficient to maintain the desired gas concentrations. Product polyethylene is removed from the reactor in discrete withdrawals to maintain a bed weight lower than a desired maximum value. The polymerization process is conducted according to the process conditions reported in Table C. Catalyst productivity (cat. prod.) is calculated based on the amount of polymer produced and the amount of procatalyst fed. Additionally, the procatalyst residual metals in the polyethylene or polyolefin can be measured, and the catalyst productivity can be determined using the residual metals and the known or measured metal content in the procatalyst before polymerization. Results for PCAT-1 are reported in Table C and results for PCAT-4 are reported in Table D. The procedure made a LLDPE or HDPE.

TABLE C

| Continuous Fluidized-Bed Gas-Phase Polymerization Process and Results. | | | | | | | | |
|---|---|---|---|---|---|---|---|---|
| Process Condition | CE-P1 | IE-P1 | CE-P2 | IE-P2 | CE-P3 | CE-P4 | IE-P3 | CE-P5 |
| Bed Temperature (° C.) | 88.0 | 88.0 | 95.0 | 95.0 | 95.0 | 95.0 | 95.0 | 95.0 |
| Reactor Pressure (Mpa) | 2.40 | 2.40 | 2.41 | 2.41 | 2.40 | 2.41 | 2.41 | 2.41 |
| Ethylene ($C_2$) Partial Pressure (Mpa) | 0.83 | 0.83 | 0.90 | 0.90 | 0.90 | 0.87 | 0.89 | 0.90 |
| $H_2/C_2$ Molar Ratio (mol $H_2$/mol $C_2$) | 0.12 | 0.25 | 0.33 | 0.47 | 0.39 | 0.47 | 0.70 | 0.54 |
| $H_2/C_2$ Weight Parts Ratio (ppm $H_2$/wt % $C_2$) | 1238 | 2453 | 3302 | 4729 | 3883 | 4694 | 7013 | 5450 |
| 1-Hexene/Ethylene Molar Ratio (mol $C_6$/mol $C_2$) | 0.14 | 0.10 | 0.02 | 0.02 | 0.03 | 0.03 | 0.01 | 0.03 |
| Isopentane concentration (mol %) | 0.33 | 0.61 | 4.97 | 4.92 | 5.05 | 4.80 | 4.94 | 5.04 |
| Constituent (A): PCAT-X (7 = PCAT-7; 1 = PCAT-1) | 7 | 7 | 1 | 1 | 1 | 1 | 1 | 1 |
| Constituent (A) Feed Rate ($cm^3$/hour) | 5.7 | 5.7 | 2.0 | 3.0 | 2.7 | 2.0 | 3.0 | 2.8 |

TABLE C-continued

Continuous Fluidized-Bed Gas-Phase Polymerization Process and Results.

| Process Condition | CE-P1 | IE-P1 | CE-P2 | IE-P2 | CE-P3 | CE-P4 | IE-P3 | CE-P5 |
|---|---|---|---|---|---|---|---|---|
| Activator | TEA | TEA | TEA | TEA | TEA | TEA | TEA | TEA |
| Activator Concentration (wt %) | 2.50 | 2.50 | 2.50 | 2.50 | 2.50 | 2.50 | 2.50 | 2.50 |
| Activator Feed Rate ($cm^3$/hour) | 245 | 246 | 88.8 | 170 | 161 | 84.0 | 153 | 167 |
| EEDC-X (1 = EEDC-1; 19 = EEDC-19) | None | 1 | None | 1 | 19 | None | 1 | 19 |
| EEDC Concentration (wt %) | | 0.125 | | 0.125 | 0.30 | | 0.125 | 0.30 |
| EEDC Feed (cc/hr) | 0.00 | 227 | 0.00 | 140 | 167 | 0.00 | 142 | 188 |
| EEDC/Ti Ratio (mol/mol) | 0.00 | 2.96 | 0.00 | 2.17 | 3.24 | 0.00 | 2.20 | 3.49 |
| Superficial Gas Velocity (SGV; m/sec) | 0.53 | 0.51 | 0.50 | 0.47 | 0.56 | 0.47 | 0.51 | 0.53 |
| Bed Height (meters) | 2.44 | 2.34 | 2.12 | 2.04 | 2.32 | 1.97 | 2.25 | 2.30 |
| Bed Weight (kg) | 44.5 | 45.0 | 42.5 | 45.1 | 40.0 | 43.5 | 55.0 | 43.6 |
| Fluidized Bed Density ($kg/m^3$) | 205 | 217 | 226 | 250 | 195 | 249 | 275 | 214 |
| Bed Volume ($m^3$) | 0.22 | 0.21 | 0.19 | 0.18 | 0.21 | 0.18 | 0.20 | 0.20 |
| Residence Time (hours) | 2.20 | 2.33 | 2.47 | 2.88 | 2.50 | 2.77 | 2.96 | 2.74 |
| Space Time Yield (STY; $kg/hr/m^3$) | 209 | 153 | 163 | 153 | 124 | 165 | 160 | 123 |
| Melt Index ($I_2$; dg/min.) | 1.1 | 1.0 | 3.7 | 3.6 | 3.57 | 9.6 | 9.3 | 10.11 |
| Resin Density (g/cc) | 0.918 | 0.918 | 0.949 | 0.949 | 0.949 | 0.952 | 0.952 | 0.952 |
| MFR ($_{21}/I_2$) ratio | 29.8 | 25.2 | 24.3 | 22.9 | 21.4 | 24.1 | 22.3 | 22.6 |
| Al/Ti (mol/mol) | 60.0 | 60.3 | 38.8 | 49.4 | 51.8 | 36.7 | 44.5 | 51.8 |
| Bulk Density ($kg/m^3$) | 341 | 354 | 315 | 330 | 272 | 347 | 366 | 301 |
| Catalyst Productivity (kg/kg; thousands) | 25.9 | 22.0 | 34.8 | 21.3 | 24.2 | 31.9 | 25.1 | 22.8 |

TABLE D

Fluidized-Bed Gas-Phase Polymerization Process Conditions and Results.

| Process Condition | CE-P6 | IE-P4 | CE-P7 | IE-P5 | CE-P8 | IE-P6 |
|---|---|---|---|---|---|---|
| Temperature (° C.) | 86.0 | 86.0 | 86.0 | 86.0 | 95.0 | 95.0 |
| Pressure (Mpa) | 2.41 | 2.41 | 2.41 | 2.41 | 2.41 | 2.41 |
| Ethylene Partial Pressure (Mpa) | 0.69 | 0.69 | 0.69 | 0.69 | 0.90 | 0.90 |
| $H_2$/Ethylene Molar Ratio (mol/mol) | 0.171 | 0.343 | 0.130 | 0.283 | 0.495 | 0.796 |
| $H_2$ (ppm/ethylene %) | 1711 | 3431 | 1302 | 2832 | 4948 | 7955 |
| 1-Hexene/Ethylene Molar Ratio (mol/mol) | 0.183 | 0.108 | 0.150 | 0.105 | 0.019 | 0.010 |
| Isopentane (mol %) | 0.09 | 0.45 | 0.22 | 0.50 | 0.21 | 0.72 |
| Constituent (A): PCAT-X (4 = PCAT-4) | 4 | 4 | 4 | 4 | 4 | 4 |
| Constituent (A) Feed Rate (cc/hr) | 3.5 | 7.0 | 3.5 | 5.0 | 4.0 | 8.0 |
| Activator | TEA | TEA | TEA | TEA | TEA | TEA |
| Activator Concentration (wt %) | 2.5 | 2.5 | 2.5 | 2.5 | 2.5 | 2.5 |
| Activator Feed Rate (cc/hr) | 47.44 | 115 | 149 | 223 | 176 | 373 |
| EEDC-X (1 = EEDC1) | 1 | 1 | 1 | 1 | 1 | 1 |
| EEDC Concentration (wt %) | N/A | 0.50 | N/A | 0.50 | N/A | 0.50 |
| EEDC Feed (cc/hr) | 0 | 256 | 0 | 122 | 0 | 311 |
| EEDC/Ti Ratio (mol/mol | 0 | 22.0 | 0 | 26.9 | 0 | 22.6 |
| Superficial Gas Velocity (SGV; m/sec) | 0.56 | 0.55 | 0.57 | 0.55 | 0.52 | 0.57 |
| Bed Height (m) | 2.44 | 2.44 | 2.44 | 2.44 | 2.44 | 2.44 |
| Bed Weight (kg) | 49.9 | 56.7 | 45.4 | 52.2 | 54.4 | 59.0 |
| Fluidized Bed Density ($kg/m^3$) | 219 | 242 | 209 | 213 | 258 | 213 |
| Bed Volume ($m^3$) | 0.218 | 0.212 | 0.215 | 0.214 | 0.211 | 0.225 |
| Residence Time (hour) | 2.64 | 3.74 | 2.26 | 2.43 | 3.18 | 3.17 |
| Space Time Yield (STY; $kg/hr/m^3$) | 5.60 | 3.83 | 6.26 | 5.50 | 5.92 | 4.60 |

TABLE D-continued

| Fluidized-Bed Gas-Phase Polymerization Process Conditions and Results. | | | | | | |
|---|---|---|---|---|---|---|
| Process Condition | CE-P6 | IE-P4 | CE-P7 | IE-P5 | CE-P8 | IE-P6 |
| Melt Index ($I_2$) (dg/min.) | 1.00 | 0.99 | 0.94 | 1.02 | 10.34 | 10.12 |
| Resin Density (g/cc) | 0.918 | 0.918 | 0.918 | 0.918 | 0.952 | 0.952 |
| MFR ($I_{21}/I_2$) ratio | 29.3 | 24.1 | 23.0 | 25.2 | 25.9 | 21.7 |
| Al/Ti (mol/mol) | 53 | 86 | 159 | 222 | 191 | 187 |
| Bulk Density (kg/m$^3$) | 354 | 343 | 337 | 325 | 386 | 408 |
| Catalyst Productivity (kg/kg, thousands) | 29.2 | 11.1 | 32.1 | 21.2 | 24.3 | 10.7 |

Batch Reactor Slurry-Phase Polymerization Procedure. The slurry phase reactor employed is a 2 liter, stainless steel autoclave equipped with a mechanical agitator. The reactor was cycled several times through a heat and nitrogen purge step to ensure that the reactor was clean and under an inert nitrogen atmosphere. Approximately 1 L of liquid isobutane is added to the reactor at ambient temperature. The reactor agitator is turned on and set to 750 rpm. Desired amounts of hydrogen ($H_2$) and 1-hexene are loaded into the reactor. The amount of $H_2$ is measured as liter (L) under STP (standard temperature and pressure). The reactor is heated to desired polymerization temperature. Ethylene is introduced to achieve a 125 psi differential pressure. TEA (triethylaluminum), external donor, and procatalyst are added from a shot cylinder using nitrogen pressure according to the catalyst component addition modes described above. The polymerization reaction proceeds at the set temperature and ethylene is added continuously to maintain constant pressure. After one hour, the reactor is vented, cooled to ambient temperature, opened, and the polymer product is recovered. Tests are performed on the polymer sample after drying. Polymerization conditions, GPC results, and iCCD results for various EEDCs and PCATs are shown later in Tables 1A to 9C.

In all batch reactor slurry-phase polymerization runs reported in Tables 1A, 2A, 3A, 4A, 8A, and 9A, the triethylaluminum/titanium atom (TEA/Ti) molar ratio is 150 (mol/mol); the 1-hexene amount is 210 mL, the procatalyst system loading is 10 mg, the amount of molecular hydrogen ($H_2$) is 7 liters (L).

In all batch reactor slurry-phase polymerization runs reported in Table 5A, the TEA/Ti molar ratio is 360 (mol/mol); the 1-hexene amount is 210 mL, the procatalyst system loading is 10 mg, the amount of $H_2$ is 7 liters (L).

In all batch reactor slurry-phase polymerization runs reported in Table 6A, the TEA/Ti molar ratio is 150 (mol/mol); the 1-hexene amount is 90 mL, the procatalyst system loading is 26 mg, the amount of $H_2$ is 3.83 liters (L).

In all batch reactor slurry-phase polymerization runs reported in Table 7A, the TEA/Ti molar ratio is 150 (mol/mol); the 1-hexene amount is 90 mL, the procatalyst system loading is 6.2 mg, the amount of $H_2$ is 7 liters (L).

Discussion of Batch Reactor Slurry-Phase Polymerization Results.

TABLE 1A

| Polymerization Results Showing Effects of EEDC-1 on PCAT-1. | | | | | | | | |
|---|---|---|---|---|---|---|---|---|
| Ex. | (A) | Catalyst Component Addition Mode | EEDC-X | EEDC/Ti (Mol/Mol) | Cat. Prod. (gPE/g cat-hr) | Δ(Cat. Prod.) (%) | $I_2$ (g/10 min) | $I_{21}/I_2$ |
| CE1 | PCAT-1 | M-1 | none | 0 | 7,382 | 0 | 17.15 | 27.1 |
| IE1 | PCAT-1 | M-1 | 1 | 2 | 6,735 | −9 | 6.63 | 25.4 |
| IE2 | PCAT-1 | M-1 | 1 | 5 | 4,340 | −41 | 5.15 | 25.1 |
| IE3 | PCAT-1 | M-1 | 1 | 50 | 2,391 | −68 | 3.06 | 25.3 |

TABLE 1B

| GPC Results Showing Effects of EEDC-1 on PCAT-1. | | | | | | | | |
|---|---|---|---|---|---|---|---|---|
| | Compositional GPC Results | | | | | | | |
| Ex. | Mw (g/mol) | Mw/Mn | Mz/Mw | Δ(Mz/Mw) (%) | SCB/ 1000TC | Δ(SCB/ 1000TC) (%) | CDI | Δ(CDI) (%) |
| CE1 | 61,714 | 3.87 | 3.63 | 0 | 8.6 | 0 | −0.87 | 0 |
| IE1 | 73,020 | 3.60 | 3.23 | −11 | 9.6 | 12 | −0.61 | 30 |
| IE2 | 80,445 | 3.56 | 2.87 | −21 | 9.6 | 12 | −0.56 | 36 |
| IE3 | 95,799 | 3.63 | 2.92 | −20 | 8.9 | 4 | −0.55 | 37 |

In Table 1A, the presence of external donor EEDC-1, polymers with low melt index $I_2$ (high Mw) and lower melt flow ratio $I_{21}/I_2$ (narrower molecular weight distribution (MWD)) are produced with decreased catalyst productivity (cat. prod.) IE1 to IE3 versus CE1.

In Table 1B, polymers obtained from using PCAT-1 without or with EEDC-1 show an increase in comonomer distribution index (CDI) (Δ(CDI)≥30%), an increase in short chain branching (SCB) (Δ(SCB/1000TC)>0), and a significant reduction in Mz/Mw (Δ(Mz/Mw)<−10%).

In Table 10 (FIG. 1), polymers obtained from using PCAT-1 without or with EEDC-1 basically do not reduce the copolymer fraction (Wt2) in these polymers (Wt2/Wt2(0) 0.98) while causing their molecular weight (Mw2) to increase (Mw2/Mw2(0)>1.20).

TABLE 2A

Polymerization Results Showing Effects of EEDC-1 on Pre-Treated PCAT-1.

| Ex. | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE1 | PCAT-1 | M-1 | none | 0 | 7,382 | 0 | 17.15 | 27.1 |
| IE4 | PCAT-2 | M-1 | EEDC-1 | 0 | 5,702 | −23 | 5.58 | 25.5 |
| IE5 | PCAT-3 | M-1 | EEDC-1 | 0 | 5,334 | −28 | 3.16 | 24.6 |

TABLE 2B

GPC Results Showing Effects of EEDC-1 on Pre-Treated PCAT-1.

| | Compositional GPC Results | | | | | | | |
|---|---|---|---|---|---|---|---|---|
| Ex. | Mw | Mw/Mn | Mz/Mw | Δ(Mz/Mw) (%) | SCB/1000TC | Δ(SCB/1000TC) (%) | CDI | Δ(CDI) (%) |
| CE1 | 61,714 | 3.87 | 3.63 | 0 | 8.6 | 0 | −0.87 | 0 |
| IE4 | 76,457 | 3.52 | 2.92 | −20 | 8.3 | −3 | −0.45 | 49 |
| IE5 | 91,226 | 3.53 | 2.88 | −21 | 8.1 | −6 | −0.47 | 47 |

Table 2C is shown in landscape orientation in FIG. 2.

TABLE 3A

Polymerization Results Showing Effects of addition mode of components of catalyst system.

| Example | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE2 | PCAT-1 | M-4 | 0 | 0 | 15,897 | 0 | 20.98 | 26.4 |
| IE6 | PCAT-1 | M-2 | EEDC-1 | 2 | 14,150 | −11 | 7.54 | 25.3 |
| IE7 | PCAT-1 | M-3 | EEDC-1 | 2 | 12,923 | −19 | 9.29 | 25.8 |
| IE8 | PCAT-1 | M-4 | EEDC-1 | 2 | 12,482 | −21 | 8.75 | 25.5 |

TABLE 3B

GPC Results Showing Effects of Addition Mode of addition mode of components of catalyst system.

| | Compositional GPC Results | | | | | | | |
|---|---|---|---|---|---|---|---|---|
| Ex. | Mw (g/mol) | Mw/Mn | Mz/Mw | Δ(Mz/Mw) (%) | SCB/1000TC | Δ(SCB/1000TC) (%) | CDI | Δ(CDI) (%) |
| CE2 | 57,484 | 4.05 | 4.49 | 0 | 9.4 | 0 | −0.68 | 0 |
| IE6 | 71,677 | 3.64 | 3.10 | −31 | 9.2 | −2 | −0.58 | 15 |
| IE7 | 68,337 | 3.67 | 3.08 | −32 | 9.8 | 4 | −0.54 | 21 |
| IE8 | 69,787 | 3.64 | 3.06 | −32 | 9.7 | 3 | −0.54 | 20 |

Table 3C is shown in landscape orientation in FIG. 3.

TABLE 4A

Polymerization Results Showing Effects of Molecular Structure of EEDC on procatalyst/catalyst systems.

| Ex. | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE2 | PCAT-1 | M-4 | 0 | 0 | 15,897 | 0 | 20.98 | 26.4 |
| IE9 | PCAT-1 | M-4 | EEDC-2 | 2 | 14,606 | −8 | 12.19 | 25.9 |
| IE10 | PCAT-1 | M-4 | EEDC-3 | 2 | 14,790 | −7 | 7.97 | 24.8 |
| IE11 | PCAT-1 | M-4 | EEDC-4 | 2 | 16,352 | 3 | 10.13 | 26.1 |
| IE12 | PCAT-1 | M-4 | EEDC-5 | 2 | 16,382 | 3 | 12.61 | 26.4 |
| IE13 | PCAT-1 | M-4 | EEDC-6 | 2 | 13,800 | −13 | 9.78 | 24.7 |
| IE14 | PCAT-1 | M-4 | EEDC-7 | 2 | 17,080 | 7 | 12.74 | 25.3 |
| IE15 | PCAT-1 | M-4 | EEDC-8 | 2 | 11,560 | −27 | 14.45 | 25.8 |
| IE16 | PCAT-1 | M-4 | EEDC-9 | 5 | 9,056 | −43 | 7.24 | 25.1 |
| IE17 | PCAT-1 | M-4 | EEDC-10 | 2 | 14,023 | −12 | 15.13 | 26.1 |
| IE51 | PCAT-1 | M-4 | EEDC-11 | 2 | 8,250 | −48 | 8.91 | 26.1 |
| IE52 | PCAT-1 | M-4 | EEDC-12 | 2 | 13,215 | −17 | 9.67 | 25.6 |
| IE53 | PCAT-1 | M-4 | EEDC-13 | 2 | 13,778 | −13 | 21.50 | 26.2 |
| IE54 | PCAT-1 | M-4 | EEDC-14 | 2 | 16,230 | 2 | 17.99 | 25.5 |
| IE55 | PCAT-1 | M-4 | EEDC-15 | 2 | 13,955 | −12 | 17.46 | 26.4 |
| IE56 | PCAT-1 | M-4 | EEDC-16 | 2 | 13,175 | −17 | 14.06 | 26.5 |
| IE18 | PCAT-1 | M-4 | EEDC-22 | 2 | 14,063 | −12 | 20.65 | 25.2 |
| IE19 | PCAT-1 | M-4 | EEDC-23 | 2 | 13,760 | −13 | 13.54 | 27.7 |
| IE20 | PCAT-1 | M-4 | EEDC-24 | 2 | 17,180 | 8 | 22.97 | 26.0 |
| IE21 | PCAT-1 | M-4 | EEDC-25 | 2 | 15,750 | −1 | 13.259 | 25.6 |
| IE22 | PCAT-1 | M-4 | EEDC-20 | 2 | 11,926 | −25 | 16.573 | 26.2 |
| IE23 | PCAT-1 | M-4 | EEDC-21 | 2 | 15,066 | −5 | 18.91 | 26.4 |

TABLE 4B

GPC Results Showing Effects of molecular structure of EEDC on procatalyst/catalyst systems

| | Compositional GPC Results | | | | | | | |
|---|---|---|---|---|---|---|---|---|
| Ex. | Mw (g/mol) | Mw/Mn | Mz/Mw | Δ(Mz/ Mw) (%) | SCB/ 1000TC | Δ(SCB/ 1000TC) (%) | CDI | Δ(CDI) (%) |
| CE2 | 57,484 | 4.05 | 4.49 | 0 | 9.4 | 0 | −0.68 | 0 |
| IE9 | 64,452 | 3.88 | 3.77 | −16 | 9.3 | −1 | −0.44 | 36 |
| IE10 | 68,685 | 3.68 | 3.16 | −30 | 8.9 | −5 | −0.22 | 68 |
| IE11 | 65,110 | 3.87 | 3.35 | −25 | 9.0 | −4 | −0.38 | 44 |
| IE12 | 63,025 | 3.96 | 3.88 | −14 | 8.8 | −6 | −0.45 | 33 |
| IE13 | 66,232 | 3.64 | 3.50 | −22 | 8.5 | −9 | −0.46 | 32 |
| IE14 | 62,781 | 3.72 | 3.30 | −27 | 8.9 | −5 | −0.33 | 51 |
| IE15 | 60,789 | 3.74 | 3.66 | −19 | 6.7 | −4 | −0.50 | 27 |
| IE16 | 71,114 | 3.55 | 3.21 | −29 | 9.5 | 2 | −0.43 | 37 |
| IE17 | 59,634 | 3.87 | 4.03 | −10 | 9.0 | −4 | −0.54 | 20 |
| IE51 | 70,566 | 3.89 | 4.61 | 3 | 7.5 | −19 | −0.37 | 45 |
| IE52 | 67,201 | 3.75 | 3.38 | −25 | 7.3 | −22 | −0.46 | 33 |
| IE53 | 56,001 | 3.95 | 4.25 | −5 | 9.7 | 3 | −0.66 | 3 |
| IE54 | 58,792 | 4.03 | 3.99 | −11 | 8.7 | −7 | −0.69 | −1 |
| IE55 | 58,717 | 3.91 | 4.07 | −9 | 9.0 | −4 | −0.60 | 13 |
| IE56 | 61,598 | 4.10 | 4.01 | −11 | 10.2 | 9 | −0.75 | −10 |
| IE18 | 55,641 | 3.87 | 4.03 | −10 | 9.5 | 1 | −0.75 | −10 |
| IE19 | 61,834 | 3.82 | 3.39 | −24 | 9.2 | −2 | −0.30 | 56 |
| IE20 | 55,200 | 3.95 | 4.11 | −8 | 9.2 | −2 | −0.57 | 16 |
| IE21 | 64,628 | 4.50 | 3.67 | −18 | 10.8 | 15 | −0.60 | 12 |
| IE22 | 60,683 | 3.94 | 3.79 | −16 | 7.4 | −21 | −0.42 | 38 |
| IE23 | 56,622 | 3.94 | 3.73 | −17 | 9.5 | 1 | −0.60 | 12 |

Table 4C is shown in landscape orientation in FIG. 4.

TABLE 5A

Polymerization Results Showing Effects of different EEDCs on PCAT-4.

| Ex. | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE3 | PCAT-4 | M-4 | none | 0 | 17,834 | 0 | 12.37 | 26.1 |
| IE24 | PCAT-4 | M-4 | EEDC-1 | 0.5 | 21,996 | 23 | 7.11 | 25.1 |
| IE25 | PCAT-4 | M-4 | EEDC-1 | 1 | 21,207 | 19 | 7.54 | 24.8 |
| IE26 | PCAT-4 | M-4 | EEDC-1 | 1.5 | 20,954 | 17 | 7.92 | 24.9 |
| IE27 | PCAT-4 | M-4 | EEDC-1 | 2 | 20,137 | 13 | 7.11 | 24.8 |
| IE28 | PCAT-4 | M-4 | EEDC-1 | 5 | 19,185 | 8 | 5.72 | 24.1 |
| IE29 | PCAT-4 | M-4 | EEDC-1 | 10 | 18,611 | 4 | 4.52 | 23.8 |
| IE30 | PCAT-4 | M-4 | EEDC-1 | 25 | 16,043 | −10 | 3.96 | 23.5 |
| IE31 | PCAT-4 | M-4 | EEDC-7 | 2 | 18,980 | 6 | 8.69 | 25.2 |
| IE32 | PCAT-4 | M-4 | EEDC-7 | 5 | 21,158 | 19 | 7.78 | 24.3 |
| IE33 | PCAT-4 | M-4 | EEDC-7 | 10 | 18,878 | 6 | 8.66 | 23.6 |
| CE4 | PCAT-4 | M-4 | EEDC-11 | 2 | 14,915 | −16 | 8.14 | 24.5 |
| CE5 | PCAT-4 | M-4 | EEDC-11 | 5 | 11,314 | −37 | 7.19 | 23.4 |
| CE6 | PCAT-4 | M-4 | EEDC-11 | 10 | 6,319 | −65 | 5.07 | 23.3 |
| IE34 | PCAT-4 | M-4 | EEDC-3 | 2 | 19,209 | 8 | 7.11 | 23.6 |
| IE35 | PCAT-4 | M-4 | EEDC-3 | 5 | 17,337 | −3 | 6.38 | 23.2 |
| IE36 | PCAT-4 | M-4 | EEDC-3 | 10 | 15,983 | −10 | 6.02 | 24.3 |
| IE37 | PCAT-4 | M-4 | EEDC-4 | 2 | 15,870 | −11 | 6.58 | 24.9 |
| IE38 | PCAT-4 | M-4 | EEDC-4 | 5 | 16,310 | −9 | 6.24 | 18.8 |
| IE39 | PCAT-4 | M-4 | EEDC-4 | 10 | 13,932 | −22 | 5.05 | 22.8 |
| IE40 | PCAT-4 | M-4 | EEDC-20 | 2 | 9,678 | −46 | 7.15 | 27.8 |
| IE41 | PCAT-4 | M-4 | EEDC-20 | 5 | 7,233 | −59 | 4.51 | 32.9 |
| IE42 | PCAT-4 | M-4 | EEDC-20 | 10 | 2,411 | −86 | 9.42 | 26.1 |

TABLE 5B

GPC Results Showing Effects of different EEDCs on PCAT-4.

| | Compositional GPC Results | | | | | | | |
|---|---|---|---|---|---|---|---|---|
| Ex. | Mw (g/mol) | Mw/Mn | Mz/Mw | Δ(Mz/Mw) (%) | SCB/1000TC | Δ(SCB/1000TC) (%) | CDI | Δ(CDI) (%) |
| CE3 | 66,555 | 3.98 | 3.53 | 0 | 8.4 | 0 | −0.50 | 0 |
| IE24 | 74,202 | 3.76 | 3.02 | −14 | 9.5 | 13 | −0.22 | 56 |
| IE25 | 73,040 | 3.66 | 3.12 | −12 | 10.2 | 21 | −0.17 | 67 |
| IE26 | 71,184 | 3.64 | 2.98 | −16 | 11.0 | 30 | −0.25 | 49 |
| IE27 | 73,596 | 3.61 | 2.99 | −15 | 11.5 | 36 | −0.21 | 58 |
| IE28 | 77,234 | 3.59 | 2.89 | −18 | 11.3 | 34 | −0.22 | 55 |
| IE29 | 80,810 | 3.41 | 2.74 | −22 | 11.0 | 31 | −0.05 | 90 |
| IE30 | 84,456 | 3.41 | 2.78 | −21 | 10.9 | 29 | −0.19 | 63 |
| IE31 | 66,473 | 4.43 | 3.27 | −7 | 10.0 | 19 | −0.29 | 42 |
| IE32 | 69,522 | 4.31 | 3.24 | −8 | 9.5 | 13 | −0.22 | 56 |
| IE33 | 69,729 | 3.71 | 2.84 | −20 | 9.8 | 17 | −0.11 | 78 |
| CE4 | 69,979 | 3.79 | 3.00 | −15 | 8.4 | 0 | −0.41 | 18 |
| CE5 | 72,606 | 3.86 | 3.14 | −11 | 7.0 | −17 | −0.35 | 30 |
| CE6 | 80,280 | 3.83 | 2.97 | −16 | 5.9 | −30 | −0.26 | 48 |
| IE34 | 71,868 | 3.85 | 3.06 | −13 | 9.4 | 12 | −0.25 | 50 |
| IE35 | 74,449 | 3.78 | 3.00 | −15 | 8.9 | 6 | −0.05 | 90 |
| IE36 | 75,238 | 3.79 | 3.08 | −13 | 8.6 | 2 | 0.0 | 100 |
| IE37 | 73,869 | 3.93 | 3.11 | −12 | 8.4 | 0 | −0.31 | 38 |
| IE38 | 74,814 | 3.88 | 3.28 | −7 | 8.7 | 4 | −0.18 | 64 |
| IE39 | 79,180 | 3.77 | 2.93 | −17 | 8.0 | −5 | −0.19 | 62 |
| IE40 | 71,119 | 5.57 | 4.86 | 38 | 7.2 | −14 | −0.30 | 40 |
| IE41 | 74,035 | 5.80 | 8.64 | 145 | 5.9 | −30 | −0.24 | 52 |
| IE42 | 71,880 | 6.84 | 4.98 | 41 | 6.1 | −27 | −0.32 | 36 |

Table 5C is shown in landscape orientation in FIG. 5.

TABLE 6A

Polymerization Results Showing Effects of EEDC-1 on PCAT-5.

| Ex. | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE7 | PCAT-5 | M-4 | none | 0 | 5,067 | 0 | 0.50 | 36.3 |
| IE43 | PCAT-5 | M-4 | EEDC-1 | 2 | 3,019 | −40 | 0.34 | 27.0 |
| IE44 | PCAT-5 | M-4 | EEDC-1 | 10 | 2,440 | −52 | 0.23 | 26.1 |
| IE45 | PCAT-5 | M-4 | EEDC-1 | 25 | 2,492 | −51 | 0.19 | 27.4 |
| IE46 | PCAT-5 | M-4 | EEDC-1 | 50 | 1,459 | −71 | 0.18 | 26.4 |

TABLE 6B

GPC Results Showing Effects of EEDC-1 on PCAT-5.

| | Compositional GPC Results | | | | | | | |
|---|---|---|---|---|---|---|---|---|
| Ex. | Mw (g/mol) | Mw/Mn | Mz/Mw | Δ(Mz/ Mw) (%) | SCB/ 1000TC | Δ(SCB/ 1000TC) (%) | CDI | Δ(CDI) (%) |
| CE7 | 170,171 | 5.47 | 5.00 | 0 | 8.3 | 0 | −0.82 | 0 |
| IE43 | 182,103 | 4.08 | 3.71 | −26 | 6.0 | −27 | −0.30 | 63 |
| IE44 | 199,838 | 4.15 | 3.59 | −28 | 7.4 | −10 | −0.36 | 57 |
| IE45 | 209,313 | 3.99 | 3.43 | −31 | 7.4 | −10 | −0.40 | 52 |
| IE46 | 213,247 | 4.07 | 3.38 | −32 | 6.0 | −27 | −0.39 | 52 |

Table 6C is shown in landscape orientation in FIG. 6.

TABLE 7A

Polymerization Results Showing Effects of EEDC-1 on PCAT-6.

| Ex. | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE8 | PCAT-6 | M-4 | none | 0 | 18,376 | 0 | 2.41 | 31.9 |
| IE47 | PCAT-6 | M-4 | EEDC-1 | 2 | 16,378 | −11 | 1.48 | 27.8 |
| IE48 | PCAT-6 | M-4 | EEDC-1 | 5 | 15,592 | −15 | 1.34 | 26.9 |
| IE49 | PCAT-6 | M-4 | EEDC-1 | 10 | 8,814 | −52 | 1.54 | 27.4 |
| IE50 | PCAT-6 | M-4 | EEDC-1 | 25 | 8,280 | −55 | 0.96 | 26.6 |

TABLE 7B

GPC Results Showing Effects of EEDC-1 on PCAT-6.

| | Compositional GPC Results | | | | | | | |
|---|---|---|---|---|---|---|---|---|
| Ex. | Mw (g/mol) | Mw/Mn | Mz/Mw | Δ(Mz/ Mw) (%) | SCB/ 1000TC | Δ(SCB/ 1000TC) (%) | CDI | Δ(CDI) (%) |
| CE8 | 116,433 | 6.35 | 5.79 | 0 | 4.7 | 0 | −0.24 | 0 |
| IE47 | 119,433 | 5.45 | 4.07 | −30 | 4.3 | −7 | −0.14 | 42 |
| IE48 | 120,191 | 5.28 | 3.61 | −38 | 4.3 | −7 | −0.09 | 63 |
| IE49 | 113,946 | 5.30 | 3.47 | −40 | 4.4 | −6 | −0.12 | 48 |
| IE50 | 129,347 | 5.31 | 3.32 | −43 | 4.8 | 2 | −0.11 | 55 |

Table 7C is shown in landscape orientation in FIG. 7.

TABLE 8A

Polymerization Results Showing Effects of EEDC-17 on PCAT-1.

| Ex. | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE1 | PCAT-1 | M-1 | none | 0 | 7,382 | 0 | 17.15 | 27.1 |
| CE9 | PCAT-1 | M-1 | EEDC-17 | 2 | 5,281 | −28 | 8.75 | 23.8 |
| CE10 | PCAT-1 | M-1 | EEDC-17 | 5 | 2,215 | −70 | 4.46 | 23.4 |
| CE11 | PCAT-1 | M-1 | EEDC-17 | 10 | 1,588 | −78 | 4.18 | 23.3 |

TABLE 8B

GPC Results Showing Effects of EEDC-17 on PCAT-1.

| | Compositional GPC Results | | | | | | | |
|---|---|---|---|---|---|---|---|---|
| Ex. | Mw (g/mol) | Mw/Mn | Mz/Mw | Δ(Mz/ Mw) (%) | SCB/ 1000TC | Δ(SCB/ 1000TC) (%) | CDI | Δ(CDI) (%) |
| CE1 | 61,714 | 3.87 | 3.63 | 0 | 8.6 | 0 | −0.87 | 0 |
| CE9 | 70,059 | 3.69 | 2.86 | −21 | 6.1 | −29 | −0.76 | 13 |
| CE10 | 84,607 | 3.63 | 2.88 | −21 | 3.7 | −57 | −0.61 | 31 |
| CE11 | 84,910 | 3.54 | 2.74 | −25 | 3.0 | −65 | −0.44 | 49 |

Table 8C is shown in landscape orientation in FIG. 8.

TABLE 9A

Polymerization Results Showing Effects of EEDC-18 on PCAT-1.

| Ex. | (A) | Catalyst Component Addition Mode | EEDC | EEDC/Ti (Mol/Mol) | Cat. Prod. (gPE/g cat-hr) | Δ(Cat. Prod.) (%) | $I_2$ (g/10 min) | $I_{21}/I_2$ |
|---|---|---|---|---|---|---|---|---|
| CE1 | PCAT-1 | M-1 | none | 0 | 7,382 | 0 | 17.15 | 27.1 |
| CE12 | PCAT-1 | M-1 | EEDC-18 | 5 | 6,090 | −18 | 2.78 | 24.9 |
| CE13 | PCAT-1 | M-1 | EEDC-18 | 10 | 5,040 | −32 | 2.57 | 24.8 |
| CE14 | PCAT-1 | M-1 | EEDC-18 | 25 | 2,670 | −64 | 2.28 | 24.2 |

TABLE 9B

GPC Results Showing Effects of EEDC-18 on PCAT-1.

| | Compositional GPC Results | | | | | | | |
|---|---|---|---|---|---|---|---|---|
| Ex. | Mw (g/mol) | Mw/Mn | Mz/Mw | Δ(Mz/ Mw) (%) | SCB/ 1000TC | Δ(SCB/ 1000TC) (%) | CDI | Δ(CDI) (%) |
| CE1 | 61,714 | 3.87 | 3.63 | 0 | 8.6 | 0 | −0.87 | 0 |
| CE12 | 96,366 | 4.26 | 7.28 | 100 | 4.1 | −52 | −0.50 | 43 |
| CE13 | 95,816 | 4.08 | 5.77 | 59 | 4.2 | −50 | −0.42 | 52 |
| CE14 | 96,854 | 3.90 | 3.35 | −8 | 4.5 | −47 | −0.31 | 64 |

Table 9C is shown in landscape orientation in FIG. 9.

As shown in Tables 2A, 2B, and 2C (FIG. 2), the magnitude of these changes can be adjusted by controlling the ratio of EEDC to the active metal Ti in the procatalyst and catalyst systems. PCAT-2 and PCAT-3 are made from pre-treating PCAT-1 with EEDC-1 before use (EEDC-1/Ti (mol/mol)=5 for PCAT-2 and EEDC-1/Ti (mol/mol)=25 for PCAT-3). Similar trends are observed when PCAT-2 and PCAT-3 are used for polymerization testing without additional amount of EEDC-1 during the polymerization reaction (IE4 and IE5 versus CE1): (1) lower $I_2$ and $I_{21}/I_2$ (Table 2A); (2) much higher CDI with high Δ(SCB/1000TC) and substantial reduction in Mz/Mw (Table 2B); and (3) little change in Wt2/VVt2(0) and much higher Mw2/Mw2 (0) (Table 2C). Results in Tables 2A to 2C also show that the PCAT-3 with a higher EEDC-1/Ti ratio has greater effects than PCAT-2 with a lower EEDC-1/Ti ratio.

Polymers in Tables 1A, 1B, and 10 (FIG. 1) are generated by premixing all catalyst components (TEA, EEDC (if used), and procatalyst) together and injecting the mixture into reactor to start the polymerization reaction (catalyst component addition mode M-1). There are other ways for the catalyst components to contact each other. It is discovered that a higher catalyst productivity (cat. prod.) can be obtained by avoiding contacting procatalyst with TEA before introducing the components into reactor. For example, catalyst productivity becomes higher for the following addition modes (Table 3A): (1) TEA, external donor (if used), and procatalyst added separately into reactor (M-2); (2) TEA and external donor contacting with each other and added into reactor followed by addition of procatalyst (M-3); and (3) TEA added into reactor first, followed by addition of the mixture of external donor and procatalyst that has been contacting with each other (M-4). The effects of EEDC-1 on PCAT-1 with different catalyst component addition modes (IE6 by M-2, IE7 by M-3, and IE8 by M-4) are similar to IE1 for the polymer from premixing all the catalyst components (Tables 3A to 3C), though the degree of the effects may be smaller.

Similar to the 2,6-dimethylpyridine (EEDC-1), EEDCs with hydrocarbyl or halogen substitution at 2-position or both 2- and 6-positions (EEDC-2 to EEDC-10 in IE9-IE17) also improve comonomer distribution (increasing CDI) (Table 4B) while not causing significant reduction in comonomer content (Wt2/Wt2(0)) and copolymer molecular weight (Mw2/Mw2(0)) (Table 4C (FIG. 4)). In contrast, substituted piperidines (EEDC-11 and EEDC-12) results in significant decreases in Δ(SCB/1000TC) (IE51 and IE52 in Table 4B). When the N atom is also substituted (EEDC-13), the molecule becomes a very weak donor that barely changes polymer properties (IE53 in Tables 4A, 4B, and 4C (FIG. 4)). Minimal effects on polymer properties, especially on CDI, are also observed when the substitution on the pyridine ring is not on the 2- or 6-positions (EEDC-14 in IE54), or the substitution is not a primary alkyl (EEDC-15 in IE55), or one of the substitution is not hydrocarbyl or halogen (EEDC-16 in IE56).

Similar to PCAT-1, procatalyst PCAT-4 contains THF internal donor, but it is made by a different method and a different Ti source (Ti alkoxide vs. Ti chloride). Although PCAT-4 exhibits higher catalyst productivity (cat. prod.) in the presence of EEDC-1 when the EEDC/Ti ratio is below certain level (different form PCAT-1 which shows lower catalyst productivity in the presence of EEDC-1; Table 5A versus Tables 1A and 3A)) and consistently higher SCB level (Table 5B versus Tables 1B and 3B), the effects of the external donor on other key polymer properties are very similar (Tables 5A, 5B, and 5C ((FIG. 5)): (1) lower $I_2$; (2) lower $I_{21}/I_2$; (3) higher CDI; (4) higher Mw2/Mw2(0); and (5) higher Wt2/Wt2(0). Results in Tables 5A to 5C also demonstrate that polymer properties are tunable by adjusting EEDC/Ti molar ratio, i.e., the constituent (B)/Ti molar ratio.

For a procatalyst that does not contain internal electron donor but contains both Ti and Hf active transition metals (PCAT-5), EEDC-1 has a more profound impact on reducing catalyst productivity and comonomer content in polymer. Nevertheless, the external donor increases CDI while increasing copolymer molecular weight (Mw2/Mw2(0) >1.4) and not reducing copolymer content (Wt2/Wt2(0) >1.0) (IE25 to IE28 vs. CE4 in Tables 6A, 6B, and 6C (FIG. 6)).

PCAT-6 is Ti-containing procatalyst without any internal electron donor. The impact of EEDC-1 external donor on PCAT-6 is similar to that on PCAT-1 which contains THF internal donor, except the changes in CDI (Δ(CDI)) are generally larger (IE29 to IE32 versus CE5 in Tables 7A, 7B, and 7C (FIG. 7)).

For comparison, when the external donor molecule has more than one electron donating functional groups with chelating coordination capability, such tetraethoxysilane (EEDC-17) and 4,4-bis(methoxymethyl)-2,6-dimethylheptane (EEDC-18), its influence on polymer attributes is different. Although it lowers $I_2$ and $I_{21}/I_2$ (CE6 to CE11 versus CE1 in Tables 8A and 9A and increase CDI (CE6 to CE11 versus CE1 in Tables 8B and 9B) like the substituted pyridine donors, the polymers obtained from using such chelating external donors have substantially reduced SCB (CE6 to CE11 versus CE1 in Table 8B and 9B). In addition, they have significantly depressed copolymer content (Wt2/Wt2(0)<0.90 (CE6 to CE11 versus CE1 in Tables 8C and 9C (FIGS. 8 and 9), and/or usually do not show increased copolymer molecular weight (Mw2/Mw2(0)<1.0 (CE6-CE11 vs. CE1 in Tables 8C and 9C). Discussion of Continuous fluidized-bed gas-phase polymerization results.

Polymerization conditions and results are reported in Tables 10 and 11, which are shown in landscape orientation in FIGS. 10 and 11, respectively.

The LLDPE polymer properties and continuous fluidized-bed gas-phase polymerization conditions are shown in Table 10. EEDC-1 was used in IE-P1, IE-P4, and IE-P5. No EEDC was used in CE-P1, CE-P6, or CE-P7. All resins made had density of 0.918 g/cc except the resin of CE-P7 had a density of 0.919 g/cc. Two types of LLDPE polymer samples are produced in the continuous fluidized bed gas phase polymerization reactor with similar MI ($I_2$ approximately 1 dg/min.) and density (approximately 0.918 g/cc). Addition of external donor EEDC-1 to PCAT-1 results in a reduction in $I_{21}/I_2$ of 4.6 units and an increase CDI of 26% (IE-P1 versus CE-P1 in Table 10). For PCAT-4, an increase CDI of 44 and 47 are observed for the TEA-lean and TEA-rich samples, respectively. Additionally, LLDPE polymer in IE-P1 achieves a 48% reduction in hexane extractables.

The HDPE polymer properties and continuous fluidized-bed gas-phase polymerization conditions are shown in Table 11. EEDC-1 was used in IE-P2, IE-P3, and IE-P6. No EEDC was used in CE-P2, CE-P4 or CE-P8. Comparative EEDC-19 was used in CE-P3 and CE-P5. Two types of HDPE polymers are also produced in the gas phase reactor. One type has $I_2$ of approximately 3.6 dg/min. and a density of approximately 0.949 g/cc. The other type has $I_2$ of approximately 9.5 dg/min. and a density of approximately 0.952 g/cc. Two types of EEDCs are employed for these polymerizations: the substituted pyridine EEDC-1 and the comparative chelating dimethoxy silane (EEDC-19). Both EEDCs lead to reduction in $I_{21}/I_2$. However, only EEDC-1 is capable of maintaining or increasing CDI with PCAT-1 (IE-P2 and IE-P3) while EEDC-19 causes a substantial drop in CDI (CE-P3 and CE-P5 in Table 11.

As shown by the foregoing working examples, the inventive embodiments may beneficially yield a polyolefin polymer having at least one of benefits (a) to (f): (a) a change in comonomer distribution index (ΔCDI); (b) a change in short chain branching distribution (ASCBD), expressed as a change in short chain branching per 1000 total carbon atoms ("ASCB/1000TC"); (c) a change in molecular weight distribution ($\Delta M_z/M_w$); and (d) a change in molecular weight (Mw2) of the copolymer fraction 2 without significantly changing the amount of copolymer fraction 2 (Wt2) in the polyolefin polymer; and (e) a change (Δ) in melt index ($I_2$; 190° C., 2.16 kg) and melt flow ratio ($I_{21}/I_2$; 190° C., 2.16 kg); all relative to a polyolefin polymer synthesized by a comparative catalyst system that is the same except lacks the (B) azaheterocycle; or (f) a change in catalyst productivity (cat. prod.) of an in situ made embodiment of the catalyst system, relative to a pre-made embodiment of the catalyst system. Without being bound by theory, it is believed that the (B) azaheterocycle functions in the catalyst system as an external donor compound in such a way that the composition and structure of the polyolefin polymer made by the catalyst system is different than that of a comparative polyolefin polymer made by a comparative catalyst system that lacks the (B) azaheterocycle as an external electron donor compound.

The invention claimed is:

1. A procatalyst system suitable for making an olefin polymerization catalyst and consisting essentially of a post-preparation blend of (A) a pre-made solid procatalyst and (B) an azaheterocycle;

wherein the (A) pre-made solid procatalyst consists essentially of a titanium compound, magnesium chloride solids, and optionally a silica;

wherein the (A) pre made solid procatalyst is made in the absence of (B) the azaheterocycle:

wherein the procatalyst system is free of an activator;

wherein the post-preparation blend is a physical admixture of (A) and (B);

wherein the magnesium chloride solids consist essentially of $MgCl_2$ and, optionally, at least one of a cyclic ($C_2$-$C_6$) ether, a ($C_1$-$C_6$) alcohol, or a hydroxyl-substituted cyclic ($C_3$-$C_7$) ether;

wherein the procatalyst system is free of any other electron donor organic compound; and wherein the (B) azaheterocycle resides on an exterior surface of the magnesium chloride solids in the physical admixture to make the post-preparation blend.

2. The procatalyst system of claim 1 wherein the (B) azaheterocycle is -an aromatic azaheterocycle of formula (I):

(I)

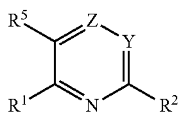

or a saturated azaheterocycle of formula (II):

(II)

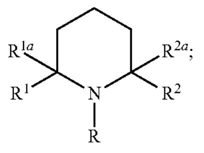

wherein Y is N or C—$R^3$; wherein Z is N or C—$R^4$; wherein R is H or an unsubstituted ($C_1$-$C_{10}$) alkyl; wherein each of $R^1$, $R^2$, $R^3$, $R^4$, $R^5$, $R^{1a}$, and $R^{2a}$ independently is H, a halogen atom, —OH, an unsubstituted ($C_1$-$C_{10}$) alkyl group, a halo-substituted ($C_1$-$C_{10}$) alkyl group, or a hydroxyl-substituted ($C_1$-$C_{10}$) alkyl group, or formula (I) is defined by any one of limitations (i) to (iv): (i) $R^1$ and $R^5$ are taken together to be a divalent group that is 1,3-butadien-1,4-diyl, (ii) when Y is C—$R^3$, $R^2$ and $R^3$ are taken together to be a divalent group that is 1,3-butadien-1,4-diyl, (iii) wherein in formula (I) when Z is C—$R^4$, $R^4$ and $R^5$ are taken together to be a divalent group that is 1,3-butadien-1,4-diyl, or (iv) both limitation (i) and (ii).

3. The procatalyst system of claim 1 wherein the magnesium chloride solids are free of the at least one of a cyclic ($C_2$-$C_6$) ether, a ($C_1$-$C_6$) alcohol, or a hydroxyl-substituted cyclic ($C_3$-$C_7$) ether.

4. The procatalyst system of claim 1 wherein the magnesium chloride solids consist essentially of $MgCl_2$ and the at least one of a cyclic ($C_2$-$C_6$) ether, a ($C_1$-$C_6$) alcohol, or a hydroxyl-substituted cyclic ($C_3$-$C_7$) ether.

5. The procatalyst system of claim 1 wherein the titanium compound is at least one compound of formula (III): $TiX_4$ (III), wherein each X independently is Cl, Br, I, or a ($C_1$-$C_6$) alkoxy.

6. The procatalyst system of claim 1 further consisting essentially of a ligand-metal complex of formula (IV): $MX_4$ (IV), wherein M is Hf or Zr and each X independently is Cl, Br, I, or a ($C_1$-$C_6$) alkoxy.

7. The procatalyst system of claim 1, wherein at least one of $R^1$, $R^2$, $R^3$, $R^4$, $R^5$, $R^{1a}$, and $R^{2a}$ is a halogen atom, —OH, an unsubstituted ($C_1$-$C_{10}$) alkyl group, a halo-substituted ($C_1$-$C_{10}$) alkyl group, or a hydroxyl-substituted ($C_1$-$C_{10}$) alkyl group.

8. A method of synthesizing a procatalyst system, the method comprising drying a mixture consisting essentially of a solution and, optionally, a silica, and being free of (B) an azaheterocycle and any other electron donor organic compound, wherein the solution consists essentially of a titanium compound, magnesium chloride, and, optionally, at least one of a cyclic ($C_2$-$C_6$) ether and a ($C_1$-$C_6$) alcohol mixed in a hydrocarbon solvent; thereby removing the hydrocarbon solvent from the mixture and crystallizing the magnesium chloride so as to give (A) a pre-made solid procatalyst; and contacting the (A) pre-made solid procatalyst with the (B) azaheterocycle; thereby making the blend of the procatalyst system of claim 1.

9. A method of making a catalyst system suitable for polymerizing an olefin, the method comprising contacting the procatalyst system of claim 1 with an activating effective amount of (C) an activator, thereby making the catalyst system; wherein the catalyst system is free of the any other electron donor organic compound and is suitable for polymerizing an olefin.

10. A method of making a catalyst system suitable for polymerizing an olefin, the method comprising contacting a post-preparation blend of (A) a pre-made solid procatalyst and (B) an azaheterocycle, and an activating effective amount of (C) an activator, thereby making the catalyst system; wherein the (A) pre-made solid procatalyst consists essentially of a titanium compound, magnesium chloride solids, and optionally a silica; wherein the (A) pre-made solid procatalyst is made in the absence of (B) the azaheterocycle; wherein the procatalyst system is free of an activator; wherein the post-preparation blend is a physical admixture of (A) and (B); wherein the magnesium chloride solids consist essentially of $MgCl_2$ and, optionally, at least one of a cyclic ($C_2$-$C_6$) ether, a ($C_1$-$C_6$) alcohol, or a hydroxyl-substituted cyclic ($C_3$-$C_7$) ether; wherein the catalyst system is free of any other electron donor organic compound and is suitable for polymerizing an olefin; and wherein the (B) azaheterocycle resides on an exterior surface of the magnesium chloride solids in the physical admixture to make the post-preparation blend.

11. A catalyst system made by the method of claim 9.

12. A method of synthesizing a polyolefin polymer, the method comprising contacting at least one olefin monomer with the catalyst system of claim 11 under effective polymerization conditions in a polymerization reactor, thereby making the polyolefin polymer.

* * * * *